(12) United States Patent
Harada

(10) Patent No.: US 8,326,524 B2
(45) Date of Patent: Dec. 4, 2012

(54) NAVIGATION DEVICE

(75) Inventor: Tomohiro Harada, Tokyo (JP)

(73) Assignee: Clarion Co., Ltd., Tokyo (JP)

( * ) Notice: Subject to any disclaimer, the term of this patent is extended or adjusted under 35 U.S.C. 154(b) by 302 days.

(21) Appl. No.: 12/670,291

(22) PCT Filed: Jul. 18, 2008

(86) PCT No.: PCT/JP2008/062993
§ 371 (c)(1),
(2), (4) Date: Apr. 19, 2010

(87) PCT Pub. No.: WO2009/014081
PCT Pub. Date: Jan. 29, 2009

(65) Prior Publication Data
US 2010/0223003 A1     Sep. 2, 2010

(30) Foreign Application Priority Data

Jul. 23, 2007  (JP) ................................. 2007-190302
Jul. 23, 2007  (JP) ................................. 2007-190400

(51) Int. Cl.
*G01C 21/00* (2006.01)
(52) U.S. Cl. ...................................................... 701/409
(58) Field of Classification Search .................. 701/400, 701/409, 415, 417, 425, FOR. 107, FOR. 108, 701/FOR. 116
See application file for complete search history.

(56) References Cited

U.S. PATENT DOCUMENTS

| | | | | |
|---|---|---|---|---|
| 5,908,465 A | * | 6/1999 | Ito et al. | 701/532 |
| 6,456,930 B1 | * | 9/2002 | Naito et al. | 701/410 |
| 6,748,316 B2 | * | 6/2004 | Takayama et al. | 701/428 |
| 7,471,215 B2 | * | 12/2008 | Wada | 340/990 |
| 8,090,533 B2 | * | 1/2012 | Koike et al. | 715/810 |
| 2008/0281511 A1 | * | 11/2008 | Miyata | 701/207 |

(Continued)

FOREIGN PATENT DOCUMENTS

EP     2196975 A1 *  6/2010

(Continued)

OTHER PUBLICATIONS

English translation of the International Preliminary Report on Patentability and Written Opinion of the International Searching Authority issued in International Patent Application No. PCT/JP2008/062993, mailed Feb. 18, 2010.

*Primary Examiner* — Faye M. Fleming
(74) *Attorney, Agent, or Firm* — McDermott Will & Emery LLP

(57) ABSTRACT

A navigation device that can surely provide information on sightseeing facilities, etc. to a user is provided.

A navigation device 1 for displaying a map screen representing the present position of a mobile on a map on which landmarks 6 are displayed is provided with a sightseeing area data base 31 for storing the position of a prescribed sightseeing area and sightseeing facilities within a prescribed sightseeing area, and a controller 10 for detecting whether a mobile enters the prescribed sightseeing area. Furthermore, the navigation device 1 includes an automatic facility display mode in which when it is detected by the controller 110 that the mobile enters the prescribed sightseeing area, the sightseeing facilities within the prescribed sightseeing areas are read out from the sightseeing area data base 31 and automatically displayed on the map, and also display of the landmarks 6 is reduced from the map.

10 Claims, 17 Drawing Sheets

U.S. PATENT DOCUMENTS

2011/0106432 A1 * 5/2011 Kawaguchi et al. .......... 701/201

FOREIGN PATENT DOCUMENTS

| JP | 08-083398 | 3/1996 |
|---|---|---|
| JP | 2000-234935 | 8/2000 |
| JP | 2002-024458 | 1/2002 |
| JP | 2002-148069 | 5/2002 |
| JP | 2005-017206 | 1/2005 |
| JP | 2006-287308 | 10/2006 |
| JP | 2009025223 A * | 2/2009 |

* cited by examiner

| 40 | 41 | 42 | 43 | 44 | 45 | 46 | 47 |
|---|---|---|---|---|---|---|---|
| FACILITIES | POSITION (LATITUDE, LONGITUDE) | ICON | AFFILIATION SIGHTSEEING AREA | FACILITY TYPE | DISPLAY PERIOD | IMAGE | DETAIL INFORMATION |
| ○○ SKI RESORT | (XA·YA) | ICON A | AREA A | PLAYING | WINTER | IMAGE A | TELEPHONE NUMBER:○○-○○:ADDRESS △△ |
| ○× PARK | (XB·YB) | ICON B | AREA B | SEEING | SPRING | IMAGE B | TELEPHONE NUMBER:○×-○○:ADDRESS △× |
| ×× GALLERY | (XC·YC) | ICON C | AREA C | SEEING | ALL YEAR | IMAGE C | TELEPHONE NUMBER:××-○○:ADDRESS ×× |
| ×○ RESTAURANT | (XD·YD) | ICON D | AREA D | EATING | ALL YEAR | IMAGE D | TELEPHONE NUMBER:×○-○○:ESTIMATED COST DAYTIME 3000YEN/PERSON,NIGHTTIME 5,000YEN/PERSON RECOMMENDED SASHIMI SET MENU IS GOOD.SWEETFISH IS RECOMMENDED IN AUGUST. SASHIMI SET MENU 1,500YEN, SWEETFISH SET MENU 1,300YEN |
| △○ PRIVATE CRAMMING SCHOOL | (XE·XE) | ICON E | AREA E | LEARNING | ALL YEAR | IMAGE E | TELEPHONE NUMBER: △△-△△ :ADDRESS: △△ |
| ... | ... | ... | ... | ... | ... | ... | ... |

FIG. 4

| NAME OF SIGHTSEEING AREA | CENTER POSITION (LATITUDE,LONGITUDE) | RADIUS(km) | BOUNDARY |
|---|---|---|---|
| AREA A | (Xa·Ya) | 2 | |
| AREA B | (Xb·Yb) | 1 | |
| AREA C | (Xc·Yc) | 2 | |
| AREA D | | | KARUIZAWA-CHO |
| ⋮ | ⋮ | ⋮ | ⋮ |

| FACILITIES | POSITION (LATITUDE, LONGITUDE) | ICON | AFFILIATION SIGHTSEEING AREA | FACILITY TYPE | DISPLAY PERIOD | IMAGE | DETAIL INFORMATION |
|---|---|---|---|---|---|---|---|
| OO SKI RESORT | (XA・YA) | ICON A | AREA A | PLAYING | WINTER | IMAGE A | FACILITY NAME:OO SKI RESORT:TELEPHONE NUMBER:OO-OO:ADDRESS △△ |
| OX PARK | (XB・YB) | ICON B | AREA B | SEEING | SPRING | IMAGE B | FACILITY NAME:OX PARK:TELEPHONE NUMBER:OX-OO:ADDRESS:△X |
| XX GALLERY | (XC・YC) | ICON C | AREA C | SEEING | ALL YEAR | IMAGE C | FACILITY NAME:XX GALLERY:TELEPHONE NUMBER:XX-OO:ADDRESS:XX |
| XO RESTAURANT | (XD・YD) | ICON D | AREA D | EATING | ALL YEAR | IMAGE D | FACILITY NAME:XO RESTAURANT:XO-OO:ADDRESS XO |
| ... | ... | ... | ... | ... | ... | ... | ... |

| FACILITIES 160 | SEASONAL INFORMATION 161 |
|---|---|
| OX PARK | OPEN BUSINESS FROM 21,MAY; HALF PRICE FOR CHILD AND PARENT |
| OX WATER RESERVOIR | CATCH SWEETFISH BY HANDS; 3,000YEN FROM 21,MAY |
| OX JINGU | HOLD SHRINE FESTIVAL ON 21,MAY |
| ⋮ | ⋮ |

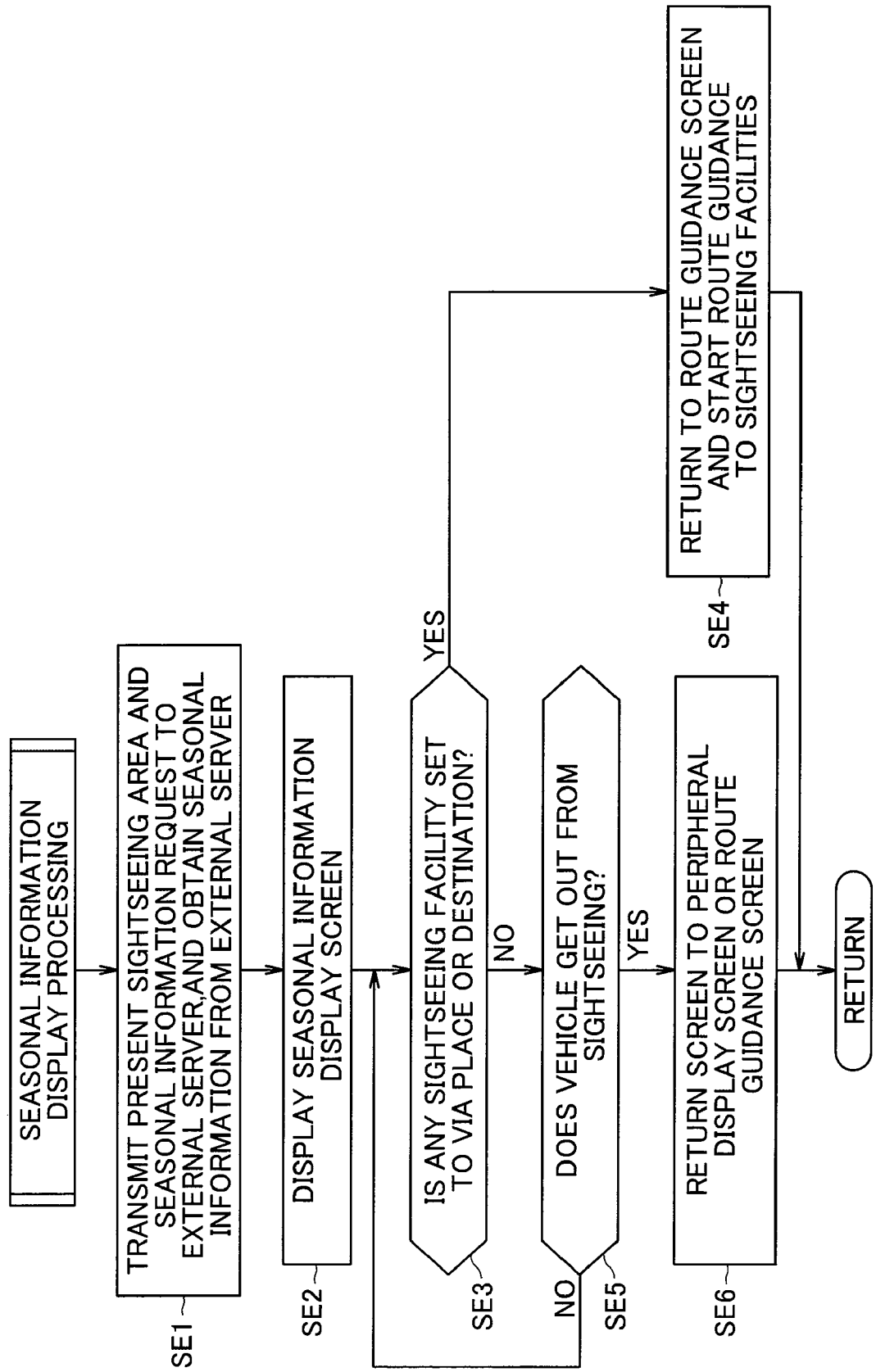

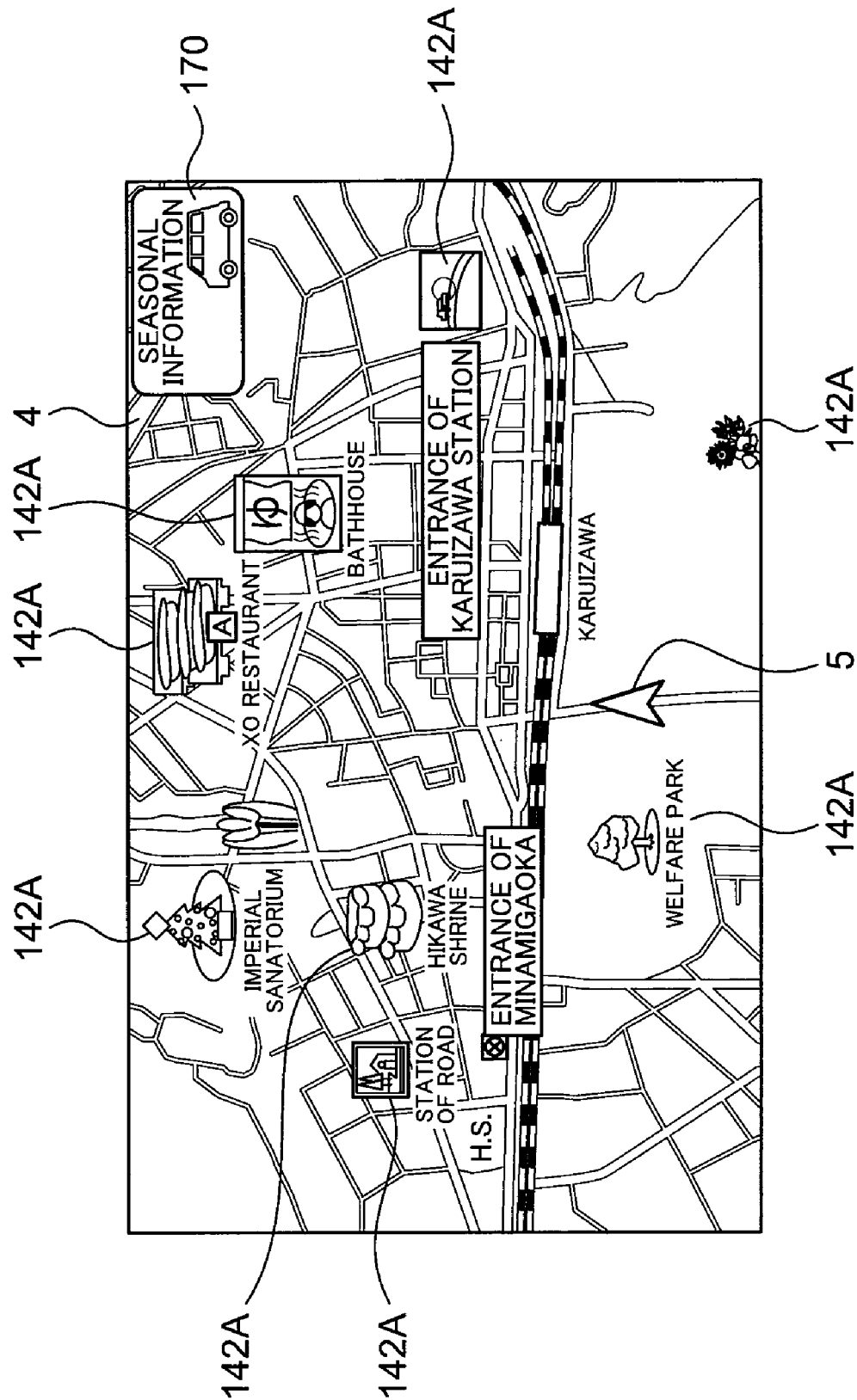

OOO JINGU
RECOMMENDED BECAUSE SHRINE FESTIVAL IS HELD ON O MONTH AND OO DAY, AND CHERRY BLOSSOMS ARE IN FULL BLOOM

OOO WATER RESERVOIR
BUSINESS IS OPENED FROM O MONTH OODAY,HALF PRICE FOR CHILD AND PARENT
000-111-2233

OOO POOL
BUSINESS IS OPENED FROM O MONTH OO DAY,AND HALF PRICE FOR CHILD AND PARENT
000-111-2233

OOO PARK
BUSINESS IS OPENED FROM O MONTH OO DAY,HALF PRICE FOR CHILD AND PARENT
000-111-2233

OOO AMUSEMENT PARK
BUSINESS IS OPENED FROM O MONTH OO DAY,HALF PRICE FOR CHILD AND PARENT
000-111-2233

COUNTRY OF OOO
BUSINESS IS OPENED FROM O MONTH OO DAY,HALF PRICE FOR CHILD AND PARENT
000-111-2233

SEE — 178A
PLAY — 178B
EAT — 178C

NAVIGATION DEVICE

RELATED APPLICATIONS

This application is the U.S. National Phase under 35 U.S.C. §371 of International Application No. PCT/JP2008/062993, filed on Jul. 18, 2008, which in turn claims the benefit of Japanese Application No. 2007-190302, filed on Jul. 23, 2007, and Japanese Application No. 2007-190400, filed on Jul. 23, 2007, the disclosures of which Applications are incorporated by reference herein.

TECHNICAL FIELD

The present invention relates to a navigation device for performing route guidance to a destination.

BACKGROUND ART

A navigation device for displaying not only a route to a destination, but also facilities such as sightseeing facilities, etc. existing around this route on a map to thereby provide valuable information to users is known in navigation devices for indicating a route to a destination on a map to perform route guidance (for example, see Patent Document 1).
Patent Document 1: JP-A-2002-148069

DISCLOSURE OF THE INVENTION

According to the above navigation device, after a route to a destination is settled, information on sightseeing facilities associated with this route, etc. are provided. Accordingly, for example, when a user who enjoys driving without having any destination drives around sightseeing facilities, the information as described above is not provided to the user. Therefore, there is a case where a user is not provided with any information on sightseeing facilities, etc. which the user would visit if these facilities exist around the present position of the user and the user knows the existence of them.

The present invention has been implemented in view of the foregoing circumstances, and has an object to provide a navigation device that can surely provide information on sightseeing facilities, etc. to a user.

MEANS OF SOLVING THE PROBLEM

In order to attain the above object, according to the present invention, a navigation device for displaying a map screen on which a present position of a mobile object is represented on a map having landmarks displayed thereon is characterized by comprising: a storage unit for storing the position of a prescribed sightseeing area and sightseeing facilities within the prescribed sightseeing area; and a detecting unit for detecting whether the mobile object enters the prescribed sightseeing area, wherein the navigation device is equipped with an automatic facility display mode for reading out the sightseeing facilities within the prescribed sightseeing area from the storage unit and automatically displaying the sightseeing facilities on the map, and reducing display of the landmarks when it is detected by the detecting unit that the mobile objects enters the prescribed sightseeing area.

According to this construction, when the mobile object enters the sightseeing area in the automatic facility display mode, the sightseeing facilities are automatically displayed, and thus the information on these sightseeing facilities can be surely provided to the user.

Furthermore, according to this construction, in the automatic facility display mode, when the mobile object enters the sightseeing area and the sightseeing facilities are displayed on the map screen, the display of the landmarks is reduced. Therefore, the sightseeing facilities can be conspicuously displayed, and visibility can be enhanced.

Here, in the navigation device of the present invention, when the mobile object exits the sightseeing area in the automatic facility display mode, the display of the sightseeing facilities within the prescribed sightseeing area may be automatically canceled.

According to this construction, when the mobile object exits the sightseeing area in the automatic facility display mode, the display of the sightseeing facilities is automatically canceled. Therefore, the visibility of the map screen can be enhanced at the outside of the sightseeing area at which it is unnecessary to display the sightseeing facilities, and also the display of the sightseeing facilities can be canceled without any user's operation, so that operability can be enhanced.

The navigation device according to the present invention may be provided with a setting unit for setting a sightseeing facility displayed in the automatic facility display mode to a destination or a via place (via point), and when the sightseeing facility is set as the destination or the via place by the setting unit, the display-canceled landmarks are displayed, and route guidance to the sightseeing facilities is started.

According to this construction, in the automatic facility display mode, for example when the user wants to visit a displayed sightseeing facility, the sightseeing facility can be easily set as a destination or a via place by the setting unit, and the route guidance can be started, so that the operability can be enhanced.

Furthermore, when the route guidance is executed, the display of the landmarks is returned, and these landmarks can be used as marks on roads.

The navigation device according to the present invention may be provided with a selecting unit for selecting a sightseeing facility displayed in the automatic facility display mode, and when the sightseeing facility is selected by the selecting unit, the periphery of the selected sightseeing facility is enlarged to obtain an enlarged map, information of the selected sightseeing facility is displayed, and information representing the distance from the selected sightseeing facility to the present position of the mobile object is displayed on the enlarged map.

According to this construction, the information of the sightseeing facilities can be easily obtained by selecting the sightseeing facility through the selecting unit. The user can refer to the information of the sightseeing facility and determine whether he/she should visit the sightseeing facility. Therefore, usability for users can be enhanced.

In the navigation device according to the present invention, a display device for displaying the map screen may be further provided and configured so that the map screen displayed on the display device can be operated by touch, the storage unit may store the position of the prescribed sightseeing area and timely information of the facilities which are matched with a present season or period, and also there may be provided a controller for displaying an instruction button for instructing display of the timely information of the sightseeing facilities on the map screen of the display device when it is detected by the detecting unit that the mobile object enters the prescribed sightseeing area.

According to this construction, when the vehicle enters the sightseeing area, the instruction button for instructing the display of the timely information of the sightseeing facilities is automatically displayed on the map screen. The display of the instruction button can enable the user to recognize that the vehicle is moving within the sightseeing area.

In addition, the timely information of the sightseeing facilities is displayed only when the instruction button is touched. Therefore, the timely information can be properly provided only when the user wants the timely information without reducing the visibility of the map screen.

In the navigation device according to the present invention, the storage unit may further store at least facility information representing the contents of the sightseeing facilities every sightseeing facility, and the controller may display the facility information and the timely information so that a touch operation can be executed every sightseeing facility when the instruction button is touched, and the controller may set a touched sightseeing facility as a destination or a via place and start when some of the sightseeing facilities is touched, and start rouge guidance to the destination or the via place.

According to this construction, the facility information and the timely information are displayed every sightseeing facility. Therefore, a user can easily and surely find out sightseeing facilities of interest from sightseeing facilities existing around the user.

Furthermore, when some sightseeing facility is touched, the touched sightseeing facility is set as a destination or a via place, and route guidance to the destination or the via place is started. Therefore, when the user finds a sightseeing facility at which the user wants to stop, the user is quickly guided to the sightseeing facility concerned by merely touching the sightseeing facility concerned.

Furthermore, in the navigation device according to the present invention, the storage unit may store the sightseeing facilities while classifying the sightseeing facilities into plural facility types, and when the instruction button is touched, the controller may display the timely information and the facility information of the sightseeing facilities belonging to one facility type in a list style every sightseeing facility, and also display, every facility type, a selection button for selecting a facility type to be displayed in the list style, whereby the selection buttons are displayed so that the number of sightseeing facilities belonging to the facility type can be visually recognized.

According to this construction, the sightseeing facilities are classified and displayed every facility type so that the displayed facility types can be selected. Therefore, only the sightseeing facilities of a facility type which is required by the user can be surely presented.

Furthermore, the selection buttons for selecting the facility types are displayed so that the number of sightseeing facilities belonging to each facility type can be visually recognized, and thus it can be surely presented to the user which type of sightseeing facilities numerously exist around the user.

In the navigation device of the present invention, when the mobile object is located out of the prescribed sightseeing area, the controller may display facilities existing around the mobile object on the map screen of the display device, and when the mobile object is located within the prescribed sightseeing area, the controller may display the sightseeing facilities in place of the facilities on the map screen of the display device.

According to this construction, when the vehicle enters a prescribed sightseeing area, only sightseeing facilities are displayed on the map screen. Therefore, a user can easily recognize what sightseeing facilities exist around the user.

Furthermore, the display of the sightseeing facilities as described above is performed during only a period for which the vehicle is located within the prescribed sightseeing area, and when the vehicle is located out of the prescribed sightseeing area, the map screen is automatically returned to the original map screen, so that the information of the sightseeing facilities can be surely presented only when the vehicle moves in the sightseeing area.

In the navigation device according to the present invention, when the mobile object is located with the prescribed sightseeing area, the controller may extract at least presently available sightseeing facilities from the sightseeing facilities within the sightseeing area on the basis of the present date and hour, and displays the extracted sightseeing facilities on the map screen.

According to this construction, the sightseeing facilities to be displayed on the map screen are limited to at least the presently available sightseeing facilities, so that only the sightseeing facilities appropriate to that period can be surely presented to the user.

Furthermore, the navigation device according to the present invention may have a communication unit which communicates with an external server for accumulating timely information of the sightseeing facilities through a network, and when the instruction button is touched, the controller may request to the external server the timely information of sightseeing facilities within a sightseeing area in which the mobile object is located, and display the timely information obtained from the external server on the display device.

According to this construction, the timely information is obtained from the external server, and thus variable information can be presented as the timely information to the user.

Furthermore, the timely information is obtained from the external server not at the timing when the vehicle enters the sightseeing area, but at a timing at which display of the timely information is instructed by the user, and thus unnecessary communication with the external server is suppressed.

EFFECT OF THE INVENTION

According to the present invention, in the automatic facility display mode, when the mobile object enters the sightseeing area, the sightseeing facilities are displayed, so that the information of the sightseeing facilities can be surely presented to the user.

BRIEF DESCRIPTION OF THE DRAWINGS

FIG. 3 is a diagram showing the construction of a sightseeing facility data base.

FIG. 4 is a diagram showing the construction of a sightseeing area data base.

FIG. 12 is a diagram showing the construction of a sightseeing facility data base.

FIG. 13 is a diagram showing the construction of a seasonal information data base.

FIG. 15 is a flowchart showing seasonal information display processing.

FIG. 16 is a diagram showing an example of the screen display within a sightseeing area.

FIG. 17 is a diagram showing an example of the seasonal information display screen.

Figure 1:
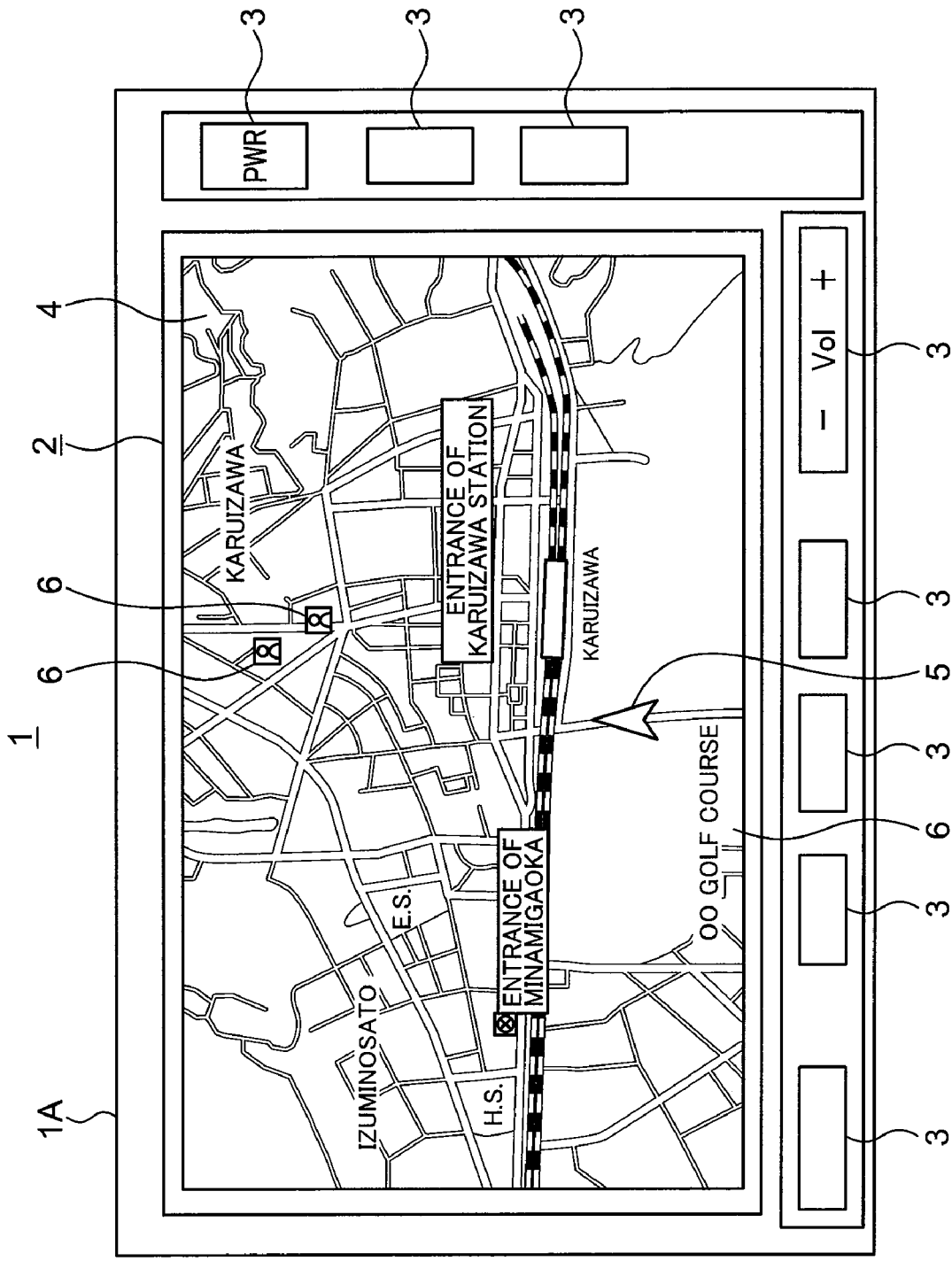
FIG. 1 is a front view showing the outlook of a car navigation device according to a first embodiment.

DESCRIPTION OF REFERENCE NUMERAL 1, 100 car navigation device
2 display panel
5 present position
6 landmark
10, 110 controller
11, 111 GPS UNIT
12, 112 DISPLAY UNIT
14, 114 STORAGE UNIT
17, 117 WIRELESS COMMUNICATION UNIT
23, 123 DATE AND HOUR COUNTER
24, 124 TOUCH PANEL
31, 131 SIGHTSEEING FACILITY DATA BASE
32, 132 SIGHTSEEING DATA BASE
33, 133 SEASONAL INFORMATION DATA BASE
60 SIGHTSEEING FACILITY INFORMATION SCREEN
61 ENLARGED MAP SCREEN
62 INTRODUCING SCREEN
63 DISTANCE INFORMATION
66, 74 VI PLACE SETTING BUTTON
67 DETAIL INFORMATION BUTTON
70 DETAIL INFORMATION SCREEN
75 DETAIL INFORMATION DISPLAY SCREEN
115 NETWORK
116 EXTERNAL SERVER
161A SEASONAL INFORMATION
170 SEASONAL INFORMATION BUTTON
175 SEASONAL INFORMATION DISPLAY SCREEN
178A TO 178C SELECTION BUTTON

BEST MODES FOR CARRYING OUT THE INVENTION

Embodiments according to the present invention will be described hereunder with reference to the drawings. In the following description, a car navigation device 1 mounted in a vehicle as a mobile object is exemplified as an embodiment of a navigation device.

First Embodiment

FIG. 1 is a front view showing the outlook of a car navigation device 1 according to this embodiment. The car navigation device 1 has a device body 1A secured to a vehicle, a display panel fitted in the front side of the device body 1A, and plural operation buttons 3 arranged around the display panel 2.

A map 4 around the present position of the vehicle and a present position 5 representing the present position of the vehicle are displayed on the display panel 2 while superposed on each other. Furthermore, landmarks 6 representing various kinds of facilities with figures, symbols and pictures are displayed on the map 4 while superposed on the map. These types of landmarks 6 contain public facilities such as offices of prefectural and city governments, administrative institutions, police offices, fire stations, schools, parks, galleries, museums, etc., accommodation facilities such as hotels, etc., traffic facilities such as stations, airports, harbors, interchanges, traffic signals, tunnels, etc., private facilities such as gas stations, convenience stores, fast food shops, golf courses, etc. It is needless to say that these landmarks 6 are represented on the map by the names thereof.

Furthermore, when a destination is input and specified to the car navigation device 1, a route extending from the present position to a destination is highlighted on the map 4, and route guidance is executed. During this route guidance, display of the route based on the map 4 and guidance of a travel direction based on voices are executed.

Figure 2:
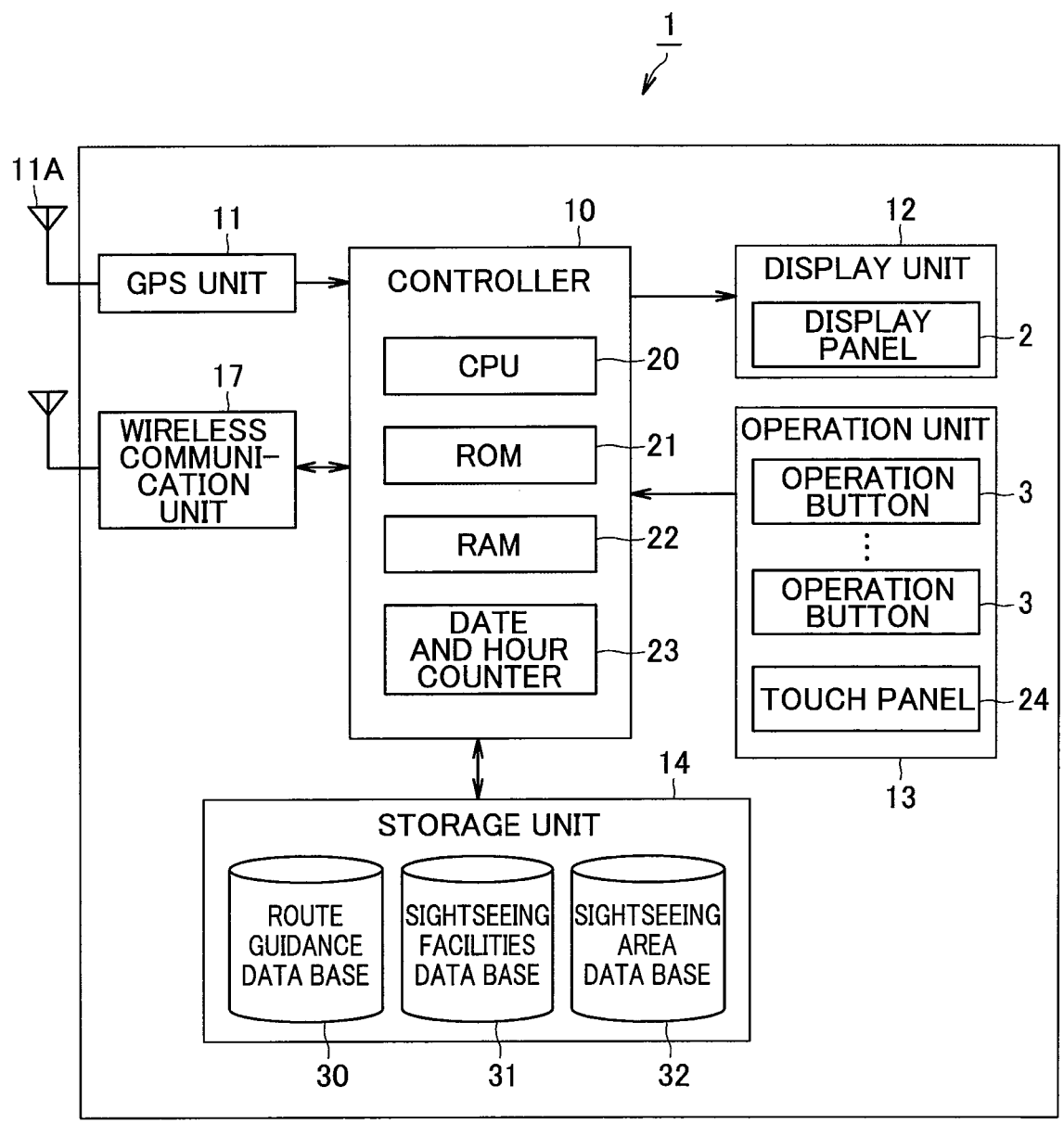
FIG. 2 is a block diagram a functional construction of the car navigation device.

FIG. 2 is a block diagram showing the functional construction of the car navigation device 1.

The car navigation device 1 has a controller 10 for concentratively controlling the respective parts, a GPS unit 11 as a position detecting unit for detecting the present position of the vehicle, a display unit 12 as a displaying section having the display panel 2, an operation unit 13 as an operating section having the plural operation buttons 3, a storage unit 14 as a storing section for storing various kinds of programs and data, and a wireless communication unit 17 as a wireless communicating section which communicates with an external server or the like through a network.

The controller 10 is configured to have CPU 20 for executing computing processing according to programs, ROM 21 for storing various kinds of programs and data, and RAM 22 functioning a work area of CPU 20, and the controller 10 further has a date and hour counter 23 which has a clock circuit and counts the date and hour.

The GPS unit 11 receives a GPS electric wave from a GPS satellite through a GPS antenna 11A, obtains present position information representing the latitude and longitude of the present position of the vehicle by calculation, and outputs the calculation result to the controller 10.

In addition to the GPS unit 11, a gyro sensor, a vehicle speed pulse sensor and an acceleration sensor may be provided to the car navigation device 1 so that self-navigation can be performed.

Under the control of the controller 10, the display unit 12 displays information for route guidance such as the map 4, the present position 5 of the vehicle, the route to the destination and various kinds of landmarks 6. An FM multiple broadcast receiver or a light/electric wave beacon receiver may be provided to the car navigation device 1 so that VICS information can be received and this VICS information is displayed on the display unit 12.

In addition to the plural operation buttons 3, the operation unit 13 further has a touch panel 24 which is disposed so as to superposed on the display panel 2 of the display unit 12, and when a user touches the display panel 2 is touched by his/her finger or the like, a signal representing a touched site is input to the controller 10. When the signal as described above is input, the controller 10 compares the touched position with the positions of the various kinds of buttons displayed on the display panel 2, and specifies which button has been touched. Furthermore, when not a button, but a landmark 6 is displayed at the touched place, it is interpreted that the landmark 6 concerned is selected by the touch operation.

The wireless communication unit 17 is connected to a network such as the Internet or the like, for example, executes data communication with an external server on the network to obtain various kinds of information from the external server, and outputs the data to the controller 10.

The storage unit 14 is configured to have a hard disk drive device with a recording medium having a relatively large data storage area or a CD/DVD drive device. The storage unit 14 has a route guidance data base 30 in which not only control programs for route guidance, but also various kinds of data provided for route guidance such as the map 4 and the landmarks 6 are stored. The route guidance data base 30 also contains the position information representing the latitude and longitude of the facilities represented by the landmarks 6.

Furthermore, the storage unit 14 has not only the route guidance data base 30, but also the sightseeing facility data base 31, but also the sightseeing area data base 32.

The sightseeing facility data base 31 stores, in a database style, facilities and places which persons visit mainly for the purpose of sightseeing, picnic and spectating (hereinafter referred to as "sightseeing facilities"). The sightseeing facilities correspond to historical building structures, famous building structures, galleries, amusement facilities such as amusement parts, zoos, etc., landscape spots and sightseeing spots, and the sightseeing facilities further contain restaurants around the facilities and the landscape spots or restaurants existing in the sightseeing spots. The sightseeing facilities may be redundant to the facilities of the landmarks 6.

FIG. 3 is a diagram showing the construction of the sightseeing facility data base 31.

As shown in FIG. 3, a record of a case of the sightseeing facility data base 31 contains a facility field 40, a position field 41, an icon field 42, an affiliation sightseeing area field 43, a facility type field 44, a display period field 45, an image filed 46 and a detail information field 47.

The facility field 40 stores the names, common names, etc. of sightseeing facilities.

The position field 41 stores position data which represent the positions of sightseeing facilities on the basis of the latitude and longitude.

The icon field 42 stores icon data representing sightseeing facility icons 42A (see FIG. 7) as figures, symbols and pictures which abstract the sightseeing facilities, or stores link information representing storage locations of the sightseeing facility icons 42A in the storage unit 14. The sightseeing facility icons 42A are used when the sightseeing facilities are displayed on the map 4.

The sightseeing facility icons 42A are substantially the same as the data of the landmarks 6. However, in order to discriminate figures, symbols and pictures representing sightseeing facilities from the landmarks 6, these sightseeing facility icons 42A may be referred to as "sightseeing facility icons". When the sightseeing facilities are the same as the facilities of the land mark 6, the data of the landmarks 6 are used as icon data for these facilities.

The affiliation sightseeing area field 43 stores a sightseeing area to which sightseeing facilities belong. This sightseeing area is defined as an area containing at least one sightseeing facility.

Specifically, in this embodiment, an area having a predetermined radius around the position of the sightseeing facility concerned is set as the sightseeing area. The predetermined radius is set in conformity with a distribution condition of eating and driving establishments suitable for eating or recess such as restaurants, etc. existing around the sightseeing facility (within a predetermined distance from the sightseeing facility). When no eating and drinking establishment exists circumferentially, a specific minimum radius is set. On the other hand, when plural eating and drinking establishments exist, the radius is set so that at least one of them is contained.

When another sightseeing facility is further contained in the sightseeing area set as described above, a sightseeing area having a predetermined radius around this sightseeing facility is combined with the sightseeing area described above to set a single sightseeing area. Even when plural sightseeing facilities are close-packed, the sightseeing areas of the respective sightseeing facilities are combined with one another to set a single large sightseeing area.

When the sightseeing facility is a relatively large area such as a sightseeing resort or the like, the sightseeing area may be set according to an administrative section of a city, town, or village containing the area concerned. In this case, the sightseeing area is defined by the boundary of this administrative section.

The information of the sightseeing area as described above is stored in the sightseeing area data base 32.

FIG. 4 is a diagram showing the construction of the sightseeing area data base 32.

As shown in FIG. 4, a record is registered every sightseeing area in the sightseeing area data base 32, and each record contains a sightseeing area name field 50, a center position field 51, a radius field 52 and a boundary field 53.

The sightseeing area name field 50 stores appellations (for example, area A, area B, . . . , in FIG. 3) or identification numbers for identifying the respective sightseeing areas.

The center position field 51 stores center position data which represents the center position of each sightseeing area by the latitude and longitude.

The radius field 52 stores the radius of the sightseeing area set as described above.

When the sightseeing area is specified by using the administrative section, the boundary field 53 stores the latitude and the longitude representing the boundary of the administrative section.

Returning to FIG. 3 again, the facility type field 44 stores a genre (category) to which sightseeing facilities belong. In this embodiment, sightseeing facilities which are suitable for excursion or sightseeing such as galleries, zoos and landscape spots are classified into a "seeing" category, amusement facilities and sport facilities such as amusement parts, pastures, golf courses, etc. are classified into a "playing" category, facilities such as eating and drinking establishments such as eating and resting such as restaurants, etc. are classified into a "eating" category, and facilities for learning such as private cramming schools, etc. are classified into a "learn" category. The genres (categories) corresponding to the sightseeing facilities are stored in the facility type field 44.

The display period field 45 specifies the period at which sightseeing facilities are displayed on the map 4. The display timing field 45 is specified by season or period suitable for visit to the sightseeing facilities. For example, winter season is set for a ski resort, and summer season is set for pool. Furthermore, in the case of summer resorts such as Karuizawa, etc. and seaside clubhouses, summer season is set. Furthermore, in the case of golf courses, galleries and restaurants, "all year" representing that they are displayed all year is set. Furthermore, in the case of parks famous for cherry blossoms, a period for which cherry trees are in full bloom is set. This season or period may be set by a period for which sightseeing facilities are available or business hours. In this embodiment, a data base in which a season and a period to which the season belongs are stored in association with each other (for example, "summer season" is associated with "from July to September", and "winter season" is associated with "from November to March", etc.) is stored in the storage unit 14, and the controller 10 refers to this data base to obtain the date corresponding to the season.

Seasons or periods suitable for visit to sightseeing facilities are set in the display period field 45, whereby only sightseeing facilities suitable for the present season or period can be extracted and displayed on the map 4, and the display of sightseeing facilities which are estimated to be unnecessary to be displayed can be reduced.

The image field 46 stores images such as photographs, etc. for introducing sightseeing facilities. For example, when the sightseeing facilities are buildings, photographs of appearance of the buildings are stored. In the case of landscape spots, landscape pictures are stored. Furthermore, in the case of restaurants, the appearance photographs thereof or photographs of dishes are stored. In addition to the photographs, images such as symbol marks, etc. may be stored.

The detail information field 47 mainly stores detailed information concerning sightseeing facilities such as the telephone numbers, addresses, etc. of the sightseeing facilities as character information. In addition to the telephone numbers and the addresses, for example when the sightseeing facilities are restaurants, information useful to know the restaurants such as recommended menus, estimated costs, etc. are stored.

Next, the operation of the thus-constructed car navigation device 1 will be described.

The car navigation device 1 according to this embodiment has, as an operation mode, not only a normal mode for performing route guidance to a destination specified by a user, etc., but also an automatic facility display mode in which when a vehicle is located within any one of the above sightseeing areas, the sightseeing facilities within the sightseeing area concerned are displayed by icons on a map and when the vehicle is out of the sightseeing area, the display of the icons is canceled. This mode is selectable by the user. The operation of the car navigation device 1 in the automatic facility display mode will be described in detail with reference to FIG. 4.

Figure 5:
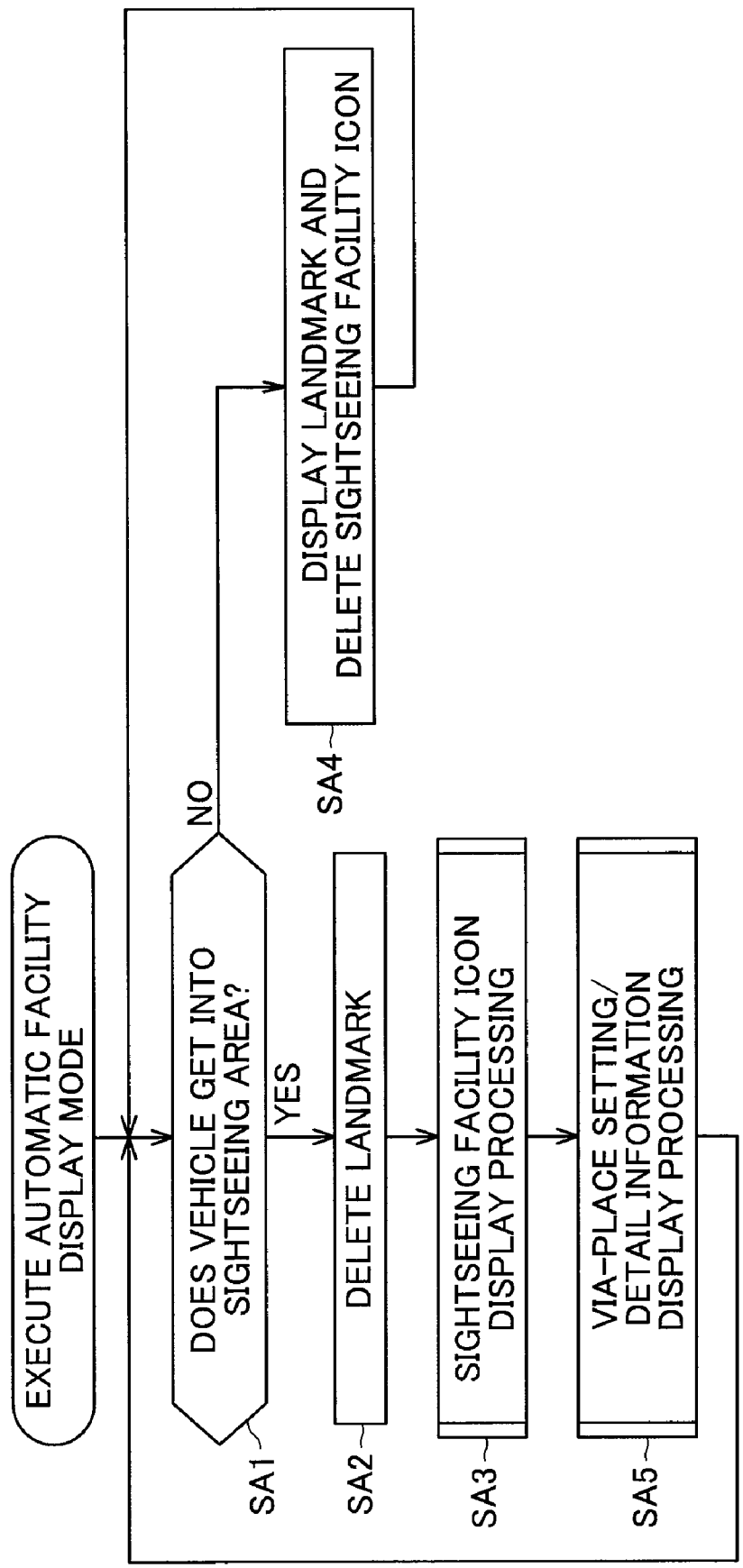
FIG. 5 is a flowchart when an automatic facility display mode is executed.

FIG. 5 is a flowchart showing the operation of the car navigation device 1. The controller 10 executes the operation shown in FIG. 5 when the automatic facility display mode is selected.

When the automatic facility display mode is executed, the controller 10 refers to the present position of the vehicle and the sightseeing area data base 32, and monitors at all times which one of the above sightseeing areas the vehicle enters (step SA1).

Figure 8:
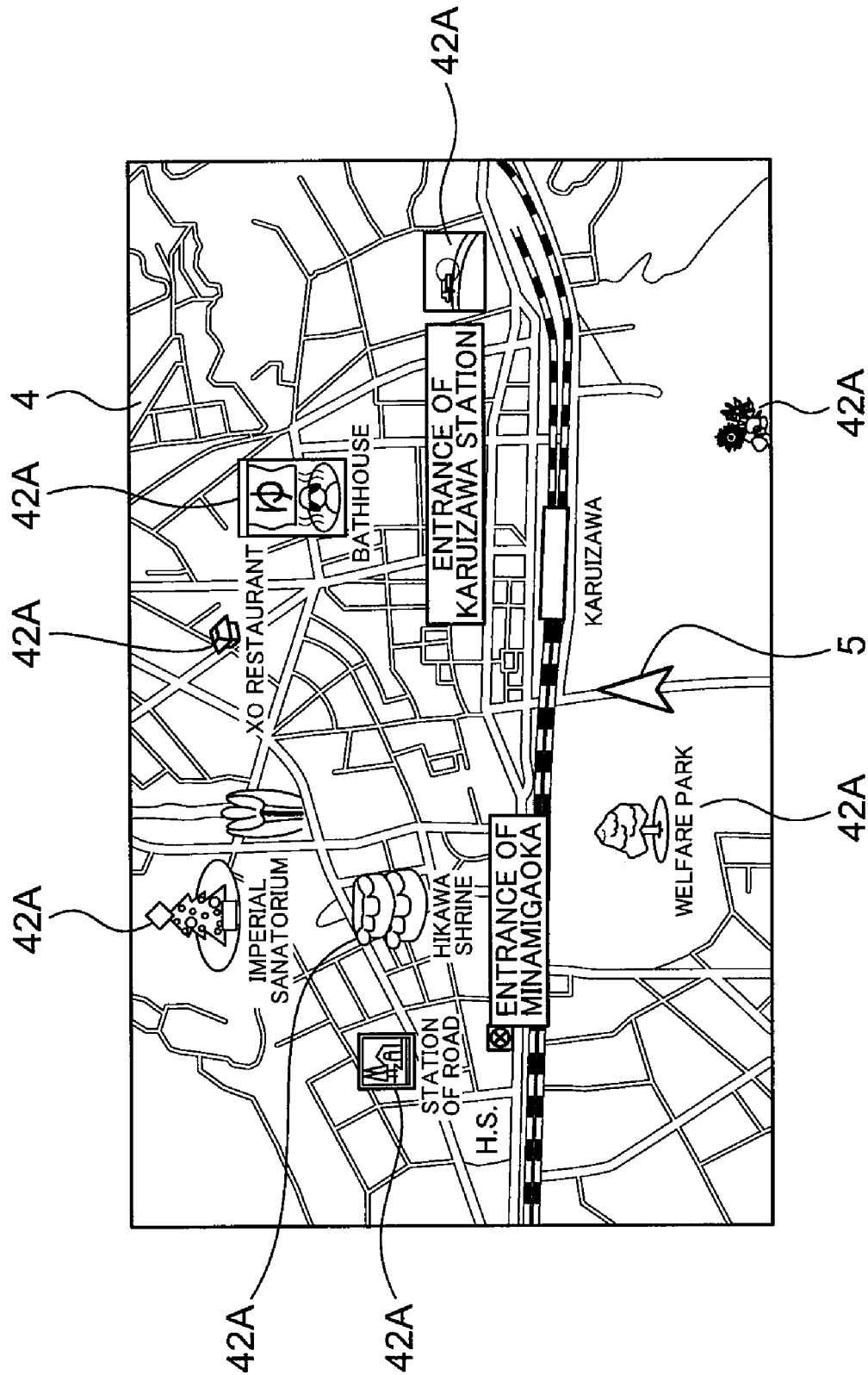
FIG. 8 is a diagram showing an example of a display state of a screen when a mobile object enters a sightseeing area in the automatic facility display mode.

When the vehicle enters any sightseeing area (step SA1: YES) (the sightseeing area in which the vehicle is located will be referred to as "located sightseeing area"), as shown in FIG. 8, the controller 10 cancels the display of the landmarks 6 on the map 4 (step SA2), and then sightseeing facility icon display processing described later is executed, whereby sightseeing facility icons 42A corresponding to predetermined sightseeing facilities out of sightseeing facilities existing in the sightseeing area concerned are displayed on the map 4 (step SA3). On the other hand, when the vehicle does not enter any sightseeing area (step SA1: NO), as shown in FIG. 1, the controller 10 displays the landmarks 6 on the map 4, and cancels the display of the sightseeing facility icons 42A (step SA4). As described above, in the automatic facility display mode, the car navigation device 1 monitors at all times which sightseeing area the vehicle enters, and when the vehicle enters any sightseeing area, the car navigation device 1 automatically cancels the display of the landmarks 6 and also displays predetermined sightseeing facility icons 42A and subsequently maintains this display state while the vehicle is located with the sightseeing area. On the other hand, when the vehicle does not enter any sightseeing area, the car navigation device 1 automatically displays the landmarks 6, cancels the display of the sightseeing facility icons 42A and subsequently maintains this display state while the vehicle is located out of the sightseeing area. The above operation is executed for the following reason.

That is, in a case where a user enjoys driving without having any destination, when the probability that the user requires information of sightseeing facilities is low, that is, the display of the sightseeing facility icons 42A is not particularly unnecessary because the vehicle is located out of the sightseeing area, the sightseeing facilities 42A are not displayed on the map 4 to thereby enhance visibility of the map 4. On the other hand, when the vehicle enters a sightseeing area, the sightseeing facility icons 42A are displayed on the map 4, thereby informing the user of the fact that the vehicle enters the sightseeing area and making the user recognize that sightseeing facilities exist nearby. Furthermore, by canceling the display of the landmarks 6, the display of the sightseeing facility icons 42A is made conspicuous, the visibility of the map 4 is enhanced, and user's curiosity is stimulated. Accordingly, after driving, the user is prevented from feeling such regret that he/she would visit sightseeing facilities if he/she knows the sightseeing facilities.

When the processing of the step SA3 is executed, the controller 10 executes via place setting/detail information display processing (hereinafter referred to as "via place setting processing") described later (step SA5), and returns the processing to the step SA1.

Furthermore, when the processing of the step SA4 is executed, the controller 10 returns the processing to the step SA1.

Next, the sightseeing facility icon display processing and the via place setting processing will be described in detail. First, the sightseeing facility icon display processing will be described.

Figure 6:
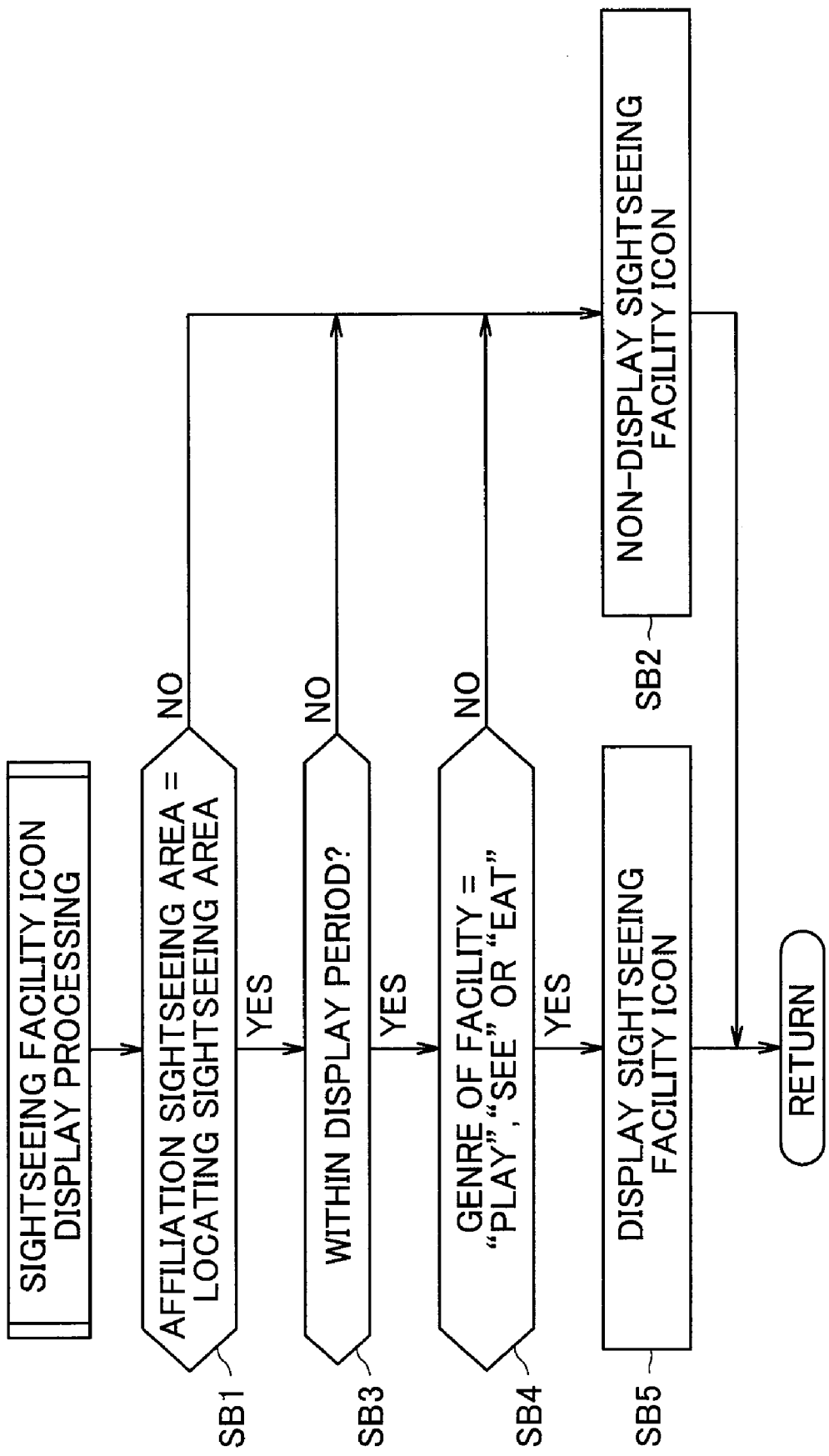
FIG. 6 is a flowchart of sightseeing facility icon display processing.

FIG. 6 is a flowchart showing the detail of the sightseeing icon display processing executed in step SA3 of FIG. 5. the controller 10 executes the following processing by referring to the sightseeing facility data base 31 every sightseeing facility (that is, every record of the sightseeing facility data base 31).

In the sightseeing facility icon display processing, the controller 10 refers to the affiliation sightseeing area field 43 of the sightseeing facility data base 31 to determine whether the affiliation sightseeing area of the sightseeing facility is coincident with the located sightseeing area which the vehicle enters at present (step SB1). When the affiliation sightseeing area of the sightseeing facility concerned is not coincident with the located sightseeing area of the vehicle (step SB1: NO), the sightseeing facility concerned does not exist in the located sightseeing area, and thus the controller 10 does not display the sightseeing facility concerned on the map 4 (step SB2).

When the affiliation sightseeing area of the sightseeing facility is coincident with the present located sightseeing area of the vehicle (step SB1: YES), the controller 10 obtains the present date and hour by the date and hour counter 23, and refers to the display period field 45 to determine whether the present date and hour is within the display period of the sightseeing facility (step SB3). When the present date and hour is not within the display period (step SB3: NO), the sightseeing facility concerned is not proper as a facility to be visited under the present period or season, and thus is unnecessary to be displayed on the map 4. Therefore, controller 10 does not display the sightseeing facility concerned on the map 4 (step SB2). Accordingly, needless information is prevented from being displayed on the map 4, and thus the visibility of the map 4 is enhanced.

On the other hand, when the present date and hour is within the display period, the controller 10 refers to the facility type field 44 to determine which one of "playing", "seeing" and "eating" corresponds to the genre of the sightseeing facility concerned (step SB4). The reason for this is as follows. Sightseeing facilities which users want to visit with high probability are sightseeing facilities of three genres of "playing", "seeing" and "eating" described above. By displaying only the sightseeing facility icons 42A associated with the sightseeing facilities of these three genres on the map 4, only valuable information is displayed on the map 4 and the visibility is enhanced.

When the genre of the sightseeing facility is not any of "playing", "seeing" and "eating" (step SB4: NO), the controller 10 does not display the sightseeing facility concerned on the map 4 (step SB2). On the other hand, when the genre of the sightseeing facility concerned is any one of "playing", "seeing" and "eating", the controller 10 refers to the position field 41 and the icon field 42, and displays the sightseeing facility icon 42A associated with the sightseeing facility concerned at the place at which the sightseeing facility concerned is located on the map 4 (step SA5). Here, the displayed sightseeing icon 42A is selectively displayed by the touch operation of the touch panel 24. As described above, according to this embodiment, all the sightseeing facilities within the located sightseeing area are not displayed, but only the sightseeing facilities 42A of sightseeing facilities valuable for the user are displayed on the basis of the display periods and the facility types of the respective sightseeing facilities, so that the visibility of the map 4 is enhanced.

Next, the via place setting processing will be described in detail.

Figure 7:
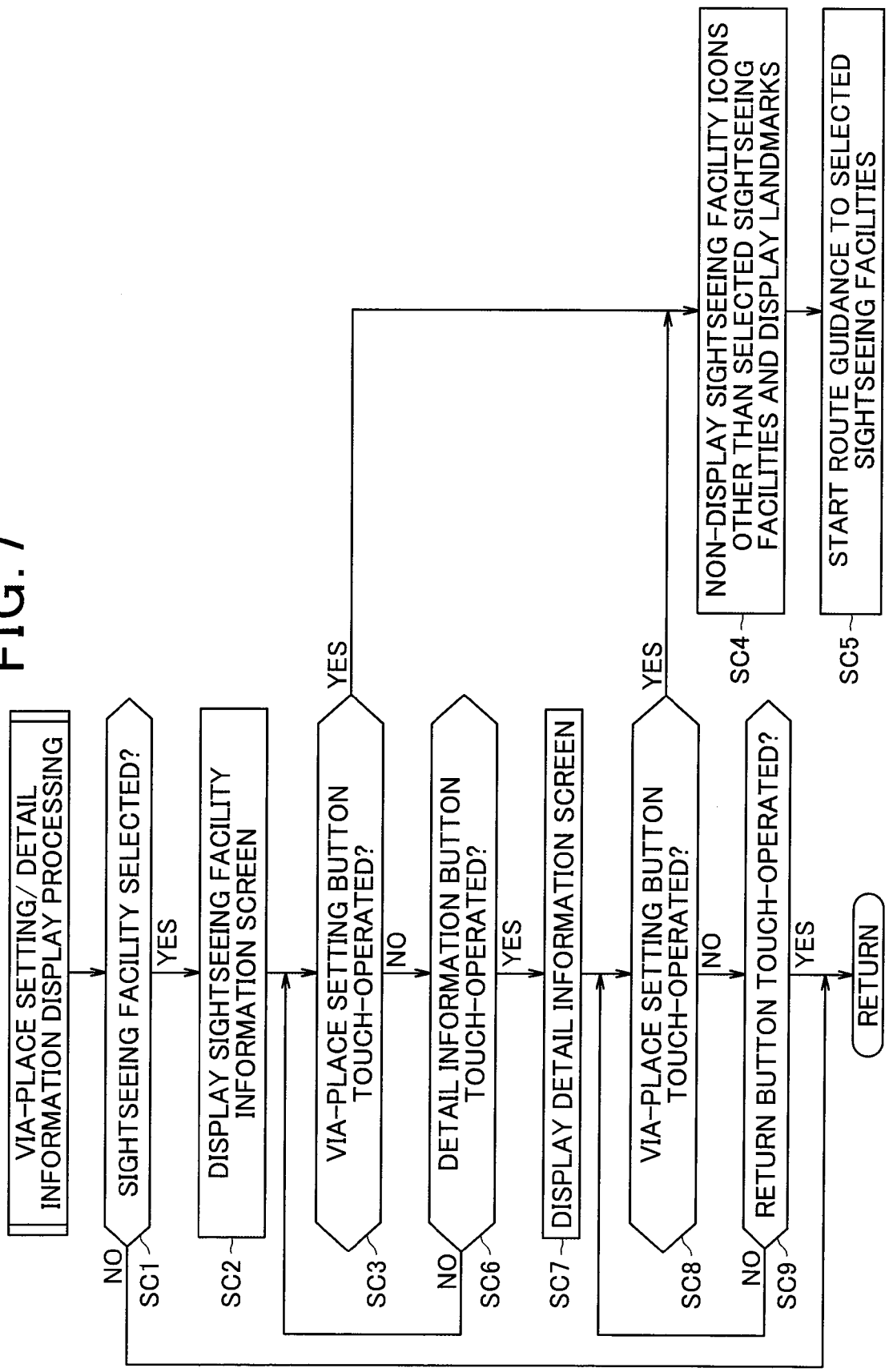
FIG. 7 is a flowchart of via place setting/detail information display processing.

FIG. 7 is a flowchart showing the detailed via place setting processing executed in step SA5 of FIG. 5.

First, the controller 10 determines whether the position corresponding to a sightseeing facility icon 42A displayed on the map 4 is touched on the touch panel 24 or not, that is, whether a sightseeing facility is selected by the user or not (step SC1) (the sightseeing facility selected by the user will be hereinafter referred to as "selected sightseeing facility"). When no sightseeing facility is selected (step SC1: NO), the controller finishes the via place setting processing.

Figure 9:
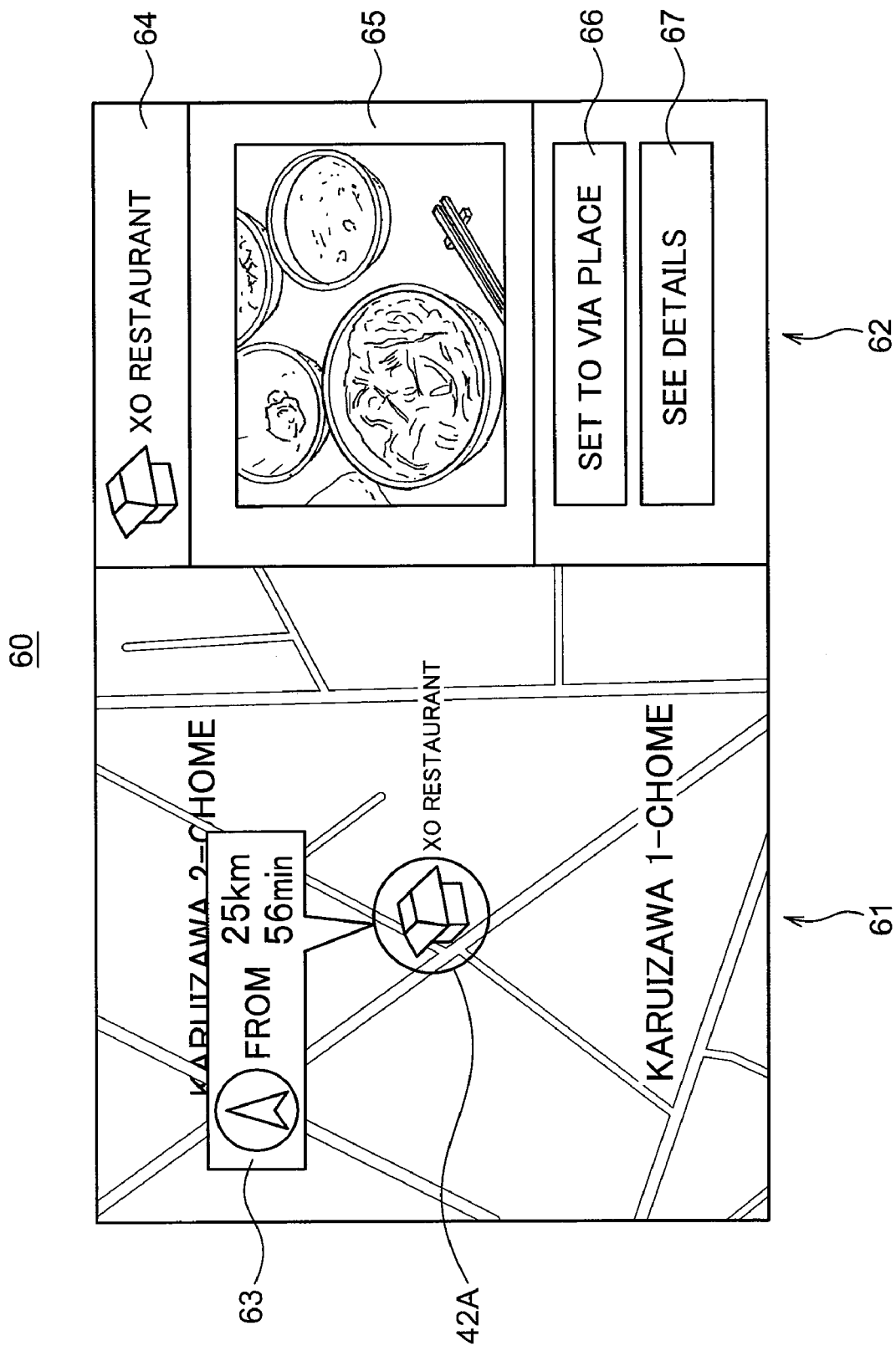
FIG. 9 is a diagram showing an example of a display state of a sightseeing facility information screen.

When a sightseeing facility is selected (step SC1: YES), the controller 10 displays a sightseeing facility information screen 60 (FIG. 9) associated with the selected sightseeing facility (step SC2). Here, the sightseeing facility information screen 60 is a screen for providing a user with information concerning selected sightseeing facility, and it has an enlarged map screen 61 formed at the left side in FIG. 8 and an introduction screen 62 formed at the right side in FIG. 8.

The enlarged map screen 61 is a screen for providing a user with information concerning the position of the selected sightseeing facility, and as shown in FIG. 8, the map of the periphery of the selected sightseeing facility is displayed in a zoom mode under the state that the sightseeing facility icon 42a associated with the selected sightseeing facility is disposed substantially at the center of the screen. Distance information 63 is displayed on the enlarged map screen 61. The distance information 63 is information concerning the distance between the selected sightseeing facility and the present position of the vehicle, and it is information as a valuable material for making decision when the user determines whether he/she visits the selected sightseeing facility. This information has information representing the physical distance between the present position and the selected sightseeing facility ("25 km" in FIG. 8) and information representing a rough indication of the time required to arrive from the present position to the selected sightseeing facility ("56 minutes" in FIG. 8) as shown in FIG. 8. By viewing the enlarged map screen 61 and the distance information 63 on the enlarged map screen 61, the user can refer to the map of the periphery of the selected sightseeing facility and the distance to the selected sightseeing facility at all times and also can use these information as a material for making decision as to whether the user should visit the selected sightseeing facility.

Furthermore, the introduction screen 62 is a screen for providing a user with information concerning the selected sightseeing facility, and it has a facility name screen 64 on which the name or common name of the selected sightseeing facility is displayed at the upper side of FIG. 8, and an image screen 65 on which an image such as a photograph or the like for introducing the selected sightseeing facility is displayed at the lower side of the facility name screen 64. The controller 10 refers to the facility field 40 of the sightseeing facility data base 31 to display the name or common name of the selected sightseeing facility of the facility name screen 64, and also refers to the image field 46 to display the image of the image screen 65.

The user refers to the facility name screen 64 and the image screen 65 to obtain information concerning an image or air of the selected sightseeing facility, and uses these information as a material for making decision as to whether he/she should visit the selected sightseeing facility.

As shown in FIG. 8, a via-place setting button 66 and a detail information button 67 are displayed at the lower side of the image screen 65 so as to be selectable by the touch operation of the touch panel 24.

After the sightseeing facility information screen is displayed in step SC2, the controller 10 determines whether the place corresponding to the via place setting button 66 on the touch panel 24 is touched or not (step SC3). The via place setting button 66 is a switch to be selected when the selected sightseeing facility is set to a via place for a prescribed destination (when no destination is set, this selected sightseeing facility itself is set to a destination), and characters "set to via place" are appended. When the via place setting button 66 is selected (step SC3: YES), the controller 10 cancels display of the sightseeing facility icons 42A other than the sightseeing facility icon 42A associated with the selected sightseeing facility out of the sightseeing facility icons 42A displayed on the map 4, displays the display-canceled landmarks 6 again in step SA2 of FIG. 4 (step SC4), and executes route guidance to the selected sightseeing facility (step SC5). Here, the display of the sightseeing facility icon 42A is canceled. The reason why the landmarks 6 are displayed is as follows. After the destination is settled, the importance of the sightseeing facility icons 42A fades. Therefore, by canceling the display of the sightseeing facility icons 42A, the visibility of the map 7 is enhanced and the route guidance is quickly performed. In addition, use of the landmarks 6 as "marks" on the route makes the driving easy.

When the via place setting button 66 is not selected in step SC3 (step SC3: YES), the controller 10 determines whether the detail information button 67 is selected or not (step SC6). Here, the detail information button 67 is a switch selected when more detailed information concerning the selected sightseeing facility is required, and the characters "see details" are appended. When the detail information button 67 is not selected (step SC6: NO), the controller 10 returns the processing to the step SC3.

Figure 10:
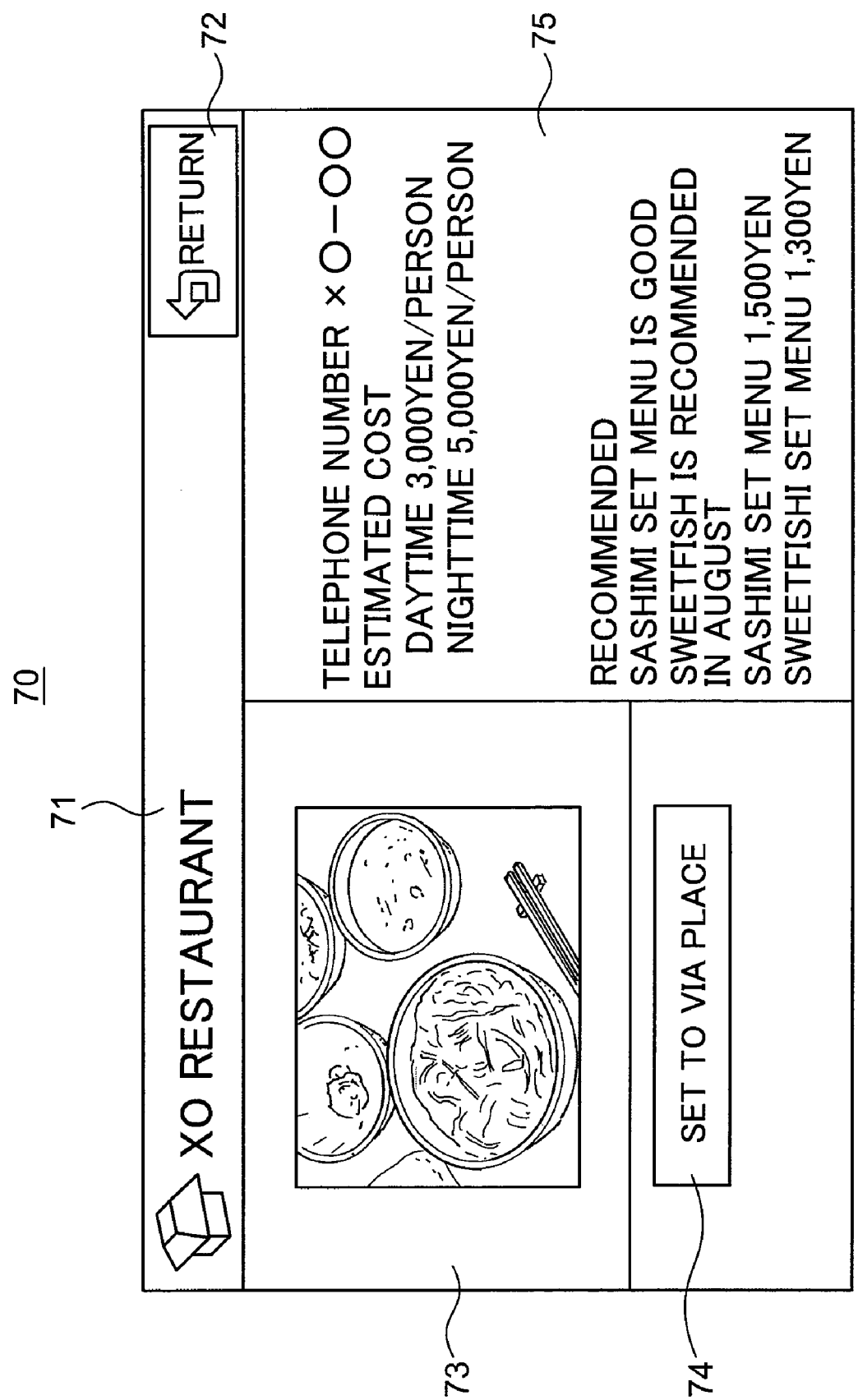
FIG. 10 is a diagram showing an example of a display state of a detail information screen.

When the detail information button 67 is selected (step SC6: YES), the controller 10 displays a detail information screen 70 (FIG. 10) associated with the selected sightseeing facility (step SC7). Here, the detail information screen 70 is a screen for providing the user with more detailed information concerning the selected sightseeing facility. As shown in FIG. 10, this screen has a facility name screen 71 for displaying the name or common name of the selected sightseeing facility at the upper side of FIG. 10, a return button 72 displayed at the right side of the facility name screen 71, an image screen 73 for displaying an image such as a photograph or the like for introducing the selected sightseeing facility displayed at the obliquely lower left side of the facility name screen 71, a vial place setting button 74 displayed at the lower side of the image screen 73, and a detail information display screen 75 for displaying detailed information of the selected sightseeing facility at the obliquely lower right side of the facility name screen 71. The facility name screen 71, the image screen 73 and the via place setting button 74 have the same function as the sightseeing facility information screen 60. The controller 10 displays more detailed information concerning the selected sightseeing facility on the detail information display screen 75 by referring to the detail information field 47 of the sightseeing facility data base 31. The user can obtain the more detailed information concerning the selected sightseeing facility by referring to this detail information display screen 75, and use this information as a material for making decision as to whether the user visits the selected sightseeing facility.

After the detail information screen 70 is displayed in step SC7, the controller 10 determines whether the via place setting button 75 is selected or not (step SC8). When the via place setting button 74 is selected (step SC8: YES), the controller 10 executes the processing of the step SC4 and the step SC5 described above, and starts the route guidance to the selected sightseeing facility.

When the via place setting button 74 is not selected (step SC8: NO), the controller 10 determines whether the return button 72 is selected or not (step SC9). When the return button 72 is not selected (step SC9: NO), the controller 10 returns the processing to the step SC6. When the return button 72 is selected (step SC9: YES), the controller 10 finishes the via place setting processing.

As described above, according to this embodiment, in the automatic facility display mode, the car navigation device 1 monitors at all times whether the vehicle is located within any sightseeing area. When the vehicle is located in a sightseeing area, the display of the landmarks 6 is automatically canceled, and predetermined sightseeing facility icons 42 are displayed. When the vehicle is located out of the sightseeing areas, the landmarks 6 are displayed, and the display of the sightseeing facility icons 42A is canceled. Therefore, when the vehicle is located within a sightseeing area, the information of the sightseeing facilities can be surely provided to the user. Furthermore, for example when the user enjoys driving without having any destination and the vehicle is located in an area other than the sightseeing area in which it is unnecessary to display sightseeing facilities, the sightseeing facility icons 42A are not displayed on the map 4, thereby enhancing the visibility of the map. Furthermore, when the vehicle is located in a sightseeing area, the sightseeing facility icons 42A are displayed on the map 4, whereby the user is made to recognize that the vehicle enters the sightseeing area. In addition, by canceling the display of the landmarks 6, the display of the sightseeing facility icons 42 is made conspicuous, the visibility of the map 4 is enhanced, and user's curiosity is stimulated. Accordingly, for example, after driving, the user is prevented from feeling such regret that he/she would visit sightseeing facilities if he/she knows the sightseeing facilities.

Furthermore, in the automatic facility display mode, the display/non-display of the sightseeing facility icons 42A is automatically performed without any user's operation, and thus the operability can be enhanced.

Furthermore, according to this embodiment, in the automatic facility display mode, the sightseeing facility information screen 60 (FIG. 9) and the detail information screen 70 (FIG. 10) are provided with the via place setting buttons 66 and 74, and the user selects the via place setting buttons 66, 67, whereby the user can easily set a selected sightseeing facility to a destination or a via place. Furthermore, after the via place setting button 66, 67 is selected, the display of the sightseeing facility icon 42A is canceled during route guidance. Therefore, the visibility of the map 7 is enhanced, and by displaying the landmark 6, the landmark 6 can be used as "mark" on the route.

Furthermore, according to this embodiment, in the automatic facility mode, the sightseeing facility icon 42A is configured to be selectable by touch operation of the touch panel 24, and the sightseeing facility information screen 60 having the enlarged map screen 61 and the introduction screen 62 is displayed when the sightseeing facility associated with the sightseeing facility icon 42 is selected. Therefore, by viewing the enlarged map screen 61 and the distance information 63 on the enlarged map screen 61, the user can refer to the map of the periphery of the selected sightseeing facility and distance to the selected sightseeing facility, and use these information as a material for making decision as to whether the user should visit the selected sightseeing facility, thereby enhancing convenience for users. Furthermore, by referring to the facility name screen 64 and the image screen 65 in the introduction screen 62, the user can obtain information concerning an image or air of the selected sightseeing facility, and use these information as a material for making decision as to whether the user should visit the selected sightseeing facility or not, whereby convenience for users can be enhanced.

The embodiment described above is an embodiment of the present invention, and any modification and any application may be made within the scope of the present invention.

For example, in the above-described embodiment, the present invention is applied to the car navigation device, however, the present invention is not limited to the car navigation device. When a navigation function is provided to a portable type mobile terminal carried by a user such as a cellular phone, PDA (Personal Digital Assistance) or the like, the present invention may be applied to the portable type mobile terminal.

Furthermore, in this embodiment, in the automatic facility display mode, when a vehicle enters a sightseeing area, the display of all the landmarks 6 is canceled. However, landmarks which are highly convenient for users such as gasoline stations out of the landmarks 6 may be left.

Still furthermore, in this embodiment, the sightseeing facilities are classified into the four genres of "playing", "seeing", "eating" and "learn", however, the present invention is not limited to these genres. Furthermore, in the facility icon display processing, only three genres of "playing", "seeing" and "eating" are set as display targets of sightseeing facility icons. However, the genre may be suitably designed in accordance with sightseeing facilities which are required to be displayed, or the user may select the genre.

Second Embodiment

An embodiment of the present invention will be described in detail with reference to the drawings.

The outlook of a car navigation device 100 according to this embodiment is the same as the navigation device 1 according to the first embodiment described with reference to FIG. 1, and thus the description thereof is omitted.

Figure 11:
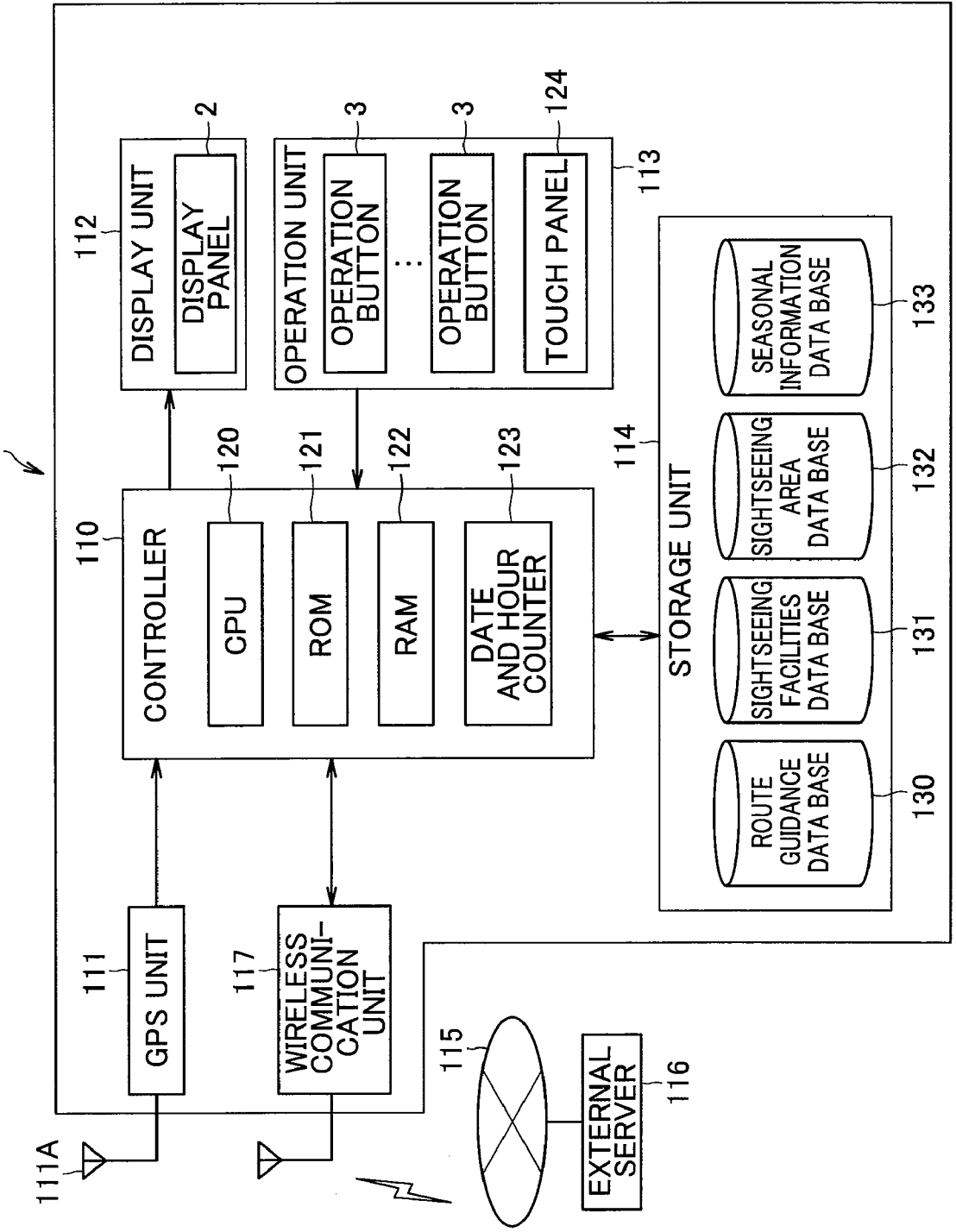
FIG. 11 is a functional block diagram showing a car navigation device according to a second embodiment.

FIG. 11 is a block diagram showing the functional construction of the car navigation device 100.

The car navigation device 100 has a controller 110 as a control unit for concentrically controlling respective parts, a GPS unit 111 as a position detecting unit for detecting the present position of a vehicle, a display unit 112 as a display section having the display panel 2 described above, an operation unit 113 as an operating section having the plural operation buttons 3 described above, a storage unit 114 as a storing section for storing various kinds of programs and data, and a wireless communication unit 117 as a wireless communicating section for communicating with an external server 116 through a network 115.

The controller 110 has CPU 120 for executing computing processing according to programs, ROM 121 for storing various kinds of programs and data, and RAM 122 functioning as a work area of CPU 120. Furthermore, the controller 110 has a date and hour counter unit 123 which contains a clock circuit and counts the date and hour.

The GPS unit 111 receives a GPS electric wave from a GPS satellite through a GPS antenna 111A, obtains present place information representing the latitude and longitude of the present position of the vehicle from the GPS signal superposed on the GPS electric wave by calculation, and outputs the present place information to the controller 110.

In addition to the GPS unit 111, a gyro sensor, a vehicle speed pulse sensor and an acceleration sensor may be provided to the car navigation device 100, thereby enabling self-navigation.

Under the control of the controller 110, the display unit 112 represents information for route guidance such as the map 4, the present position 5 of the vehicle, a route to a destination and various kinds of landmarks 6. An FM multiple broadcast receiver or an optical/electric wave beacon receiver may be provided to the car navigation device 100 so that VICS information can be received, and the VICS information may be displayed on the display unit 112.

In addition to the plural operation buttons 3, the operation unit 113 has a touch panel 124 disposed so as to be superposed on the display panel 2 of the display unit 112. When the user touches the display panel 2 by his/her finger or the like, a signal representing the touched place is input to the controller 110. When the signal is input, the controller 110 compares the input signal with the position of each kind of button displayed on the display panel 2, and specifies which button is touched. Furthermore, when not a button, but a landmark 6 is displayed at the touched place, the controller 110 interprets that the landmark 6 concerned is selected by the touch operation.

The wireless communication unit 117 is connected to a network 115 such as the Internet or the like, for example, and it executes data communication with the external server 116 in which seasonal information (timely information) is accumulated, obtains the seasonal information from the external server 116 and outputs the information to the controller 110. This seasonal information will be described later.

The storage unit 114 is configured as a hard disk drive device having a recording medium having a relatively large data storage area or a CD/DVD drive device. The storage unit 114 has not only a control program for route guidance, but also a route guidance data base 130 in which various kinds of data supplied for route guidance such as the map 4 and the landmarks 6. The route guidance data base 130 also contains the position information on the latitude and longitude of each of the facilities represented by the landmarks 6. In addition to the route guidance data base 130, the storage unit 114 has a sightseeing facility data base 131, a sightseeing area data base 132 and a seasonal information data base 133.

The sightseeing facility data base 131 mainly stores facilities and places which persons visit for tourism, picnic and sightseeing as primary purpose (hereinafter referred to as "sightseeing facilities") while compiling a database of these information. The sightseeing facilities correspond to historical building structures, famous building structures, galleries, amusement facilities such as amusement parts, zoos, etc., landscape spots and sightseeing spots, and the sightseeing facilities further contain restaurants around the facilities and the landscape spots or restaurants existing in the sightseeing spots. The sightseeing facilities may be redundant to the facilities of the landmarks 6.

FIG. 12 is a diagram showing the construction of the sightseeing facility database 131.

As shown in FIG. 12, a record of a case of the sightseeing facility data base 131 contains a facility field 140, a position field 141, an icon field 142, an affiliation sightseeing area field 143, a facility type field 144, a display period field 145, an image filed 146 and a detail information field 147.

The facility field 140 stores the names, common names or identification symbols for uniquely specifying the sightseeing facilities.

The position field 141 stores position data which represent the positions of sightseeing facilities on the basis of the latitude and longitude.

The icon field 142 stores icon data with which the sightseeing facilities are represented by abstracted figures, symbols and pictures, or stores link information representing storage locations of the icon data in the storage unit 14. The icon data are used when the sightseeing facilities are displayed on the map 4.

The icon data are substantially the same as the data of the landmarks 6. However, in order to discriminate figures, symbols and pictures representing sightseeing facilities from the landmarks 6, the icon data will be referred to as "icons". When the sightseeing facilities are the same as the facilities of the landmark 6, the data of the landmarks 6 are used as icon data for these facilities.

The affiliation sightseeing area field 143 stores sightseeing areas to which sightseeing facilities belong. This sightseeing area is defined as an area containing at least one sightseeing facility.

Specifically, in this embodiment, an area having a predetermined radius around the position of the sightseeing facility concerned is set as the sightseeing area. The predetermined radius is set in conformity with a distribution condition of eating and driving establishments suitable for eating or recess such as restaurants, etc. existing around the sightseeing facility (within a predetermined distance from the sightseeing facility). When no eating and drinking establishment exists circumferentially, a specific minimum radius is set. On the other hand, when plural eating and drinking establishments exist, the radius is set so that at least one of them is contained.

When another sightseeing facility is further contained in the sightseeing area set as described above, a sightseeing area having a predetermined radius around this sightseeing facility is combined with the sightseeing area described above to set a single sightseeing area. Even when plural sightseeing facilities are close-packed, the sightseeing areas of the respective sightseeing facilities are combined with one another to set a single large sightseeing area.

When the sightseeing facility is a relatively large area such as a sightseeing resort or the like, the sightseeing area may be set according to an administrative section of a city, town, or village containing the area concerned. In this case, the sightseeing area is defined by the boundary of this administrative section.

The information of the sightseeing area as described above is stored in the sightseeing area data base 132. The construction of the sightseeing area data base 132 is the same as the sightseeing area data base 32 according to the first embodiment described with reference to FIG. 4, and thus the description thereof is omitted.

Returning to FIG. 12 again, the facility type field 44 stores a genre (category) to which sightseeing facilities belong. In this embodiment, sightseeing facilities which are suitable for excursion or sightseeing such as galleries, zoos and landscape spots are classified into a "seeing" category, amusement facilities and sport facilities such as amusement parts, pastures, golf courses, etc. are classified into a "playing" category, and facilities such as eating and drinking establishments such as eating and resting such as restaurants, etc. are classified into a "eating" category. The genres (categories) corresponding to the sightseeing facilities are stored in the facility type field 144.

The display period field 145 specifies the period at which sightseeing facilities are displayed on the map 4. The display timing field 45 is specified by season or period suitable for visit to the sightseeing facilities. For example, winter season is set for a ski resort, and summer season is set for pool. Furthermore, in the case of summer resorts such as Karuizawa, etc. and seaside clubhouses, summer season is set. Furthermore, in the case of golf courses, galleries and restaurants, "all year" representing that they are displayed all year is set. Furthermore, in the case of parks famous for cherry blossoms, a period for which cherry trees are in full bloom is set. This season or period may be set by a period for which sightseeing facilities are available or business hours.

Seasons or periods suitable for visit to sightseeing facilities are set in the display period field 145, whereby only sightseeing facilities suitable for the present season or period can be extracted and displayed on the map 4, and the display of sightseeing facilities which are estimated to be unnecessary to be displayed can be reduced.

The image field 146 stores images such as photographs, etc. for introducing sightseeing facilities. For example, when the sightseeing facilities are buildings, photographs of appearance of the buildings are stored. In the case of landscape spots, landscape pictures are stored. Furthermore, in the case of restaurants, the appearance photographs thereof or photographs of dishes are stored. In addition to the photographs, images such as symbol marks, etc. may be stored.

The detail information field 147 stores information (facility information) with which the contents of sightseeing facilities can be estimated such as the names, addresses and contact addresses of the sightseeing facilities, and information representing the contact addresses, etc. of the sightseeing facilities. When charges required for use of facilities such as admission charges, etc. are given, the charges may be stored in the detail information.

The seasonal information data base 133 is used to mange seasonal information every sightseeing facility, and a facility field 160 and a seasonal information field 161 are contained in a record of one case as shown in FIG. 13.

The facility field 160 is identical to the facility field 140 of the sightseeing facility data base 131. That is, the facility field 160 stores names, common names or identification symbols for uniquely identifying sightseeing facilities, and the record of the seasonal information data base 133 and the record of the sightseeing facility data base 131 are associated with each other by this facility field 160.

The seasonal information is timely information on the current day or in the period containing the day concerned. For example, the seasonal information corresponds to a business opening day of a sightseeing facility, information on events put on the sightseeing facility, highlight information, recommended menu information in the case of restaurants, etc. Persons who engage in the respective sightseeing facilities or the like create these seasonal information and provide the information concerned to a content distributor. Accordingly, these information is collectively accumulated and managed in the external server 116 managed by the content distributor, and transmitted to the car navigation device 100 through the network 115.

Here, not the construction that the external server 116 push-distributes seasonal information to the car navigation device 100, but the construction that the external server 116 pull-distributes seasonal information in response to an information distribution request from the car navigation device 100 is used. Accordingly, unnecessary seasonal information is prevented from being transmitted to the car navigation device 100, and also reduction of traffic and shortening of communication time can be performed.

Next, the operation of the thus-constructed car navigation device 100 will be described with reference to a flowchart of FIG. 14.

Figure 14:
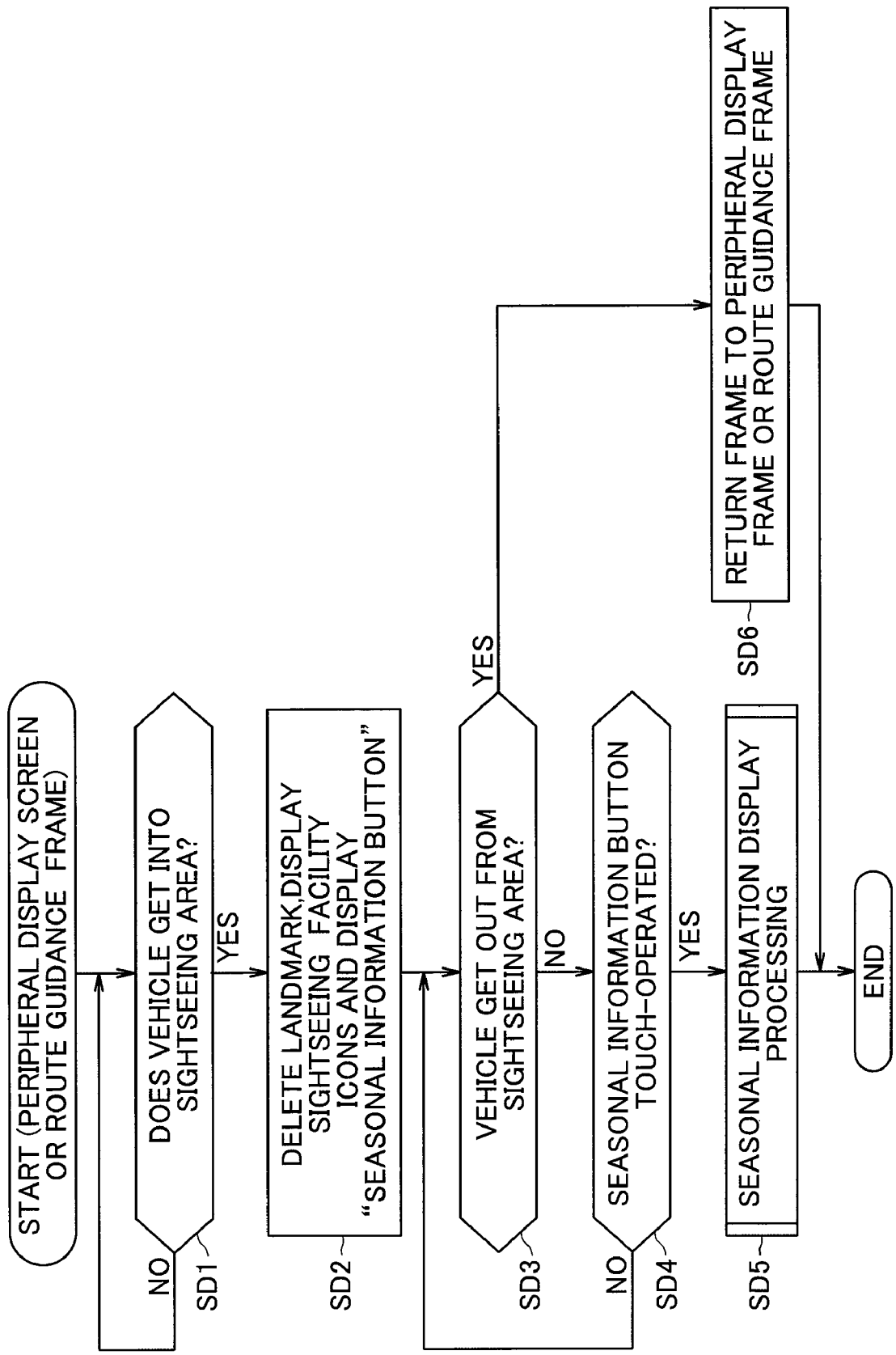
FIG. 14 is a flowchart showing the operation of the car navigation device.

As in the case of the navigation device 1 according to the first embodiment, the controller 110 executes the operation shown in FIG. 14 when the automatic facility display mode is selected.

The processing shown in FIG. 14 is executed when the map 4 is displayed on the display panel 2 like a case where the present periphery is being displayed or route guidance is being executed.

As shown in FIG. 14, the controller 110 of the car navigation device 100 compares the present location information of the vehicle obtained from the GPS unit 111 with each sightseeing area registered in the sightseeing area data base 132, and determines whether the vehicle enters a sightseeing area (step SD1). When the vehicle is out of the sightseeing area (step SD1: NO), het processing of the step SD1 is executed again after a fixed period elapses, thereby intermittently detecting entrance of the vehicle into the sightseeing area.

When the vehicle enters the sightseeing area (step SD1: YES), the controller 110 executes the processing of the following step in order to notify the user of the entrance into the sightseeing area and present sightseeing facilities existing in the sightseeing area concerned to the user.

That is, in step SD2, the controller 110 deletes landmarks 6 representing facilities existing around the vehicle on the map 4 displayed on the whole surface of the display panel 2, extracts from the sightseeing facility data base 131 sightseeing facilities which exist in the sightseeing area concerned and have display periods containing the present date and hour, displays the icons 142A of the sightseeing facilities concerned at the places corresponding to the positions of the sightseeing facilities while superposing the icons 142A on the map 4, and also partially displays a seasonal information button (instruction button) 170 (step SD2) as shown in FIG. 16.

As described above, when the vehicle enters the sightseeing area, the sightseeing facilities are automatically displayed on the map 4, whereby the entrance of the vehicle into the sightseeing area and only the optimum sightseeing facilities to visit in the present season or period are presented to the user by screen display.

At this time, the landmarks 6 which are normally displayed on the map 4 are deleted, and the icons 142A of the sightseeing facilities are displayed. Therefore, even in the limited display area, the icons 142A can be displayed in such a size as to be sufficiently visibly recognizable. Furthermore, the discrimination from other existing displays of the map 4 can be enhanced.

When the vehicle enters the sightseeing area, sound may be emitted or a lamp may be turned on to notify it to the user. Furthermore, the names (or abbreviated expressions) of the sightseeing facilities may be displayed in the neighborhood of the icons 142A of the sightseeing facilities so that the user can easily recognize which sightseeing facilities these sightseeing seeing icons represent.

Subsequently, as in the case of the step SC1, it is determined whether the vehicle exits the sightseeing area or not (step SD3). When the vehicle is still located in the sightseeing area (step SD3: NO) it is determined whether the seasonal information button 170 is touched or not (step SD4). When the seasonal information button 170 is touched (step SD4: YES), the controller 110 executes season information display processing described later so that timely information of the respective sightseeing facilities displayed on the map 4 is presented to the user as seasonal information (step SD5), and then finishes the processing. Furthermore, when the season information button 170 is not touched (step SD4: NO), the processing is returned to the step SD3 again.

When the vehicle exits the sightseeing area (step SD3: YES), it is unnecessary to display the sightseeing facilities in the sightseeing area, and thus the screen display of the display panel 2 is quickly returned to the screen for the periphery display or the route guidance, and then finishes the processing.

In the season information display processing, as shown in FIG. 15, the controller 110 transmits, through the network 115 to the external server 116, the identification of a sightseeing area (for example, the name) at which the vehicle is located at present together with a distribution request of seasonal information, and obtains the seasonal information of the sightseeing facilities in the sightseeing area concerned as a response to the distribution request from the external server 116, and stores the seasonal information into the seasonal information data base 133 (step SE1). As described above, the controller 110 communicates with the external server 116 to obtain the seasonal information only when the display of the seasonal information is indicated to the user, whereby needless communication with the external server 116 can be reduced.

Subsequently, the controller 110 displays a seasonal information display screen 175 shown in FIG. 17 on the whole screen of the display panel 2 (step SE2). The seasonal information display screen 175 is divided into two areas in the vertical direction, that is, a sightseeing facility display area 176 at the upper side and a sightseeing facility selecting area 177 at the lower area.

In the sightseeing facility display area 176 is displayed only a list of sightseeing facilities which are located in the present sightseeing area and belong to any one of the facility types of "seeing", "playing" and "eating". Images 146A of the sightseeing facilities, detail information 147A and seasonal information 161A of the sightseeing facilities are displayed every column of the sightseeing facility in the list style. At this time, only the detail information 147A is displayed with respect to the sightseeing facilities whose seasonal information 161A is not obtained from the external server 116. Furthermore, when the sightseeing facilities are displayed in a list style, the present date and hour is compared with the value of the display period field 145, and only the sightseeing facilities suitable for the present season or period are displayed.

A column of any sightseeing facility which is displayed in a list style is touched, the sightseeing facility displayed in this column is set as a via place or a destination.

Furthermore, a "seeing" selection button 178A, a "playing" selection button 178B and a "eating" selection button 178C are displayed in the sightseeing facility selecting area 177. When any selection button 178A to 178C is touched, the facility type of the sight seeing facility displayed in the sightseeing facility display area 176 is switched.

At this time, each of the selection buttons 178A to 178C is constructed by a so-called "fun ring (FUNRING)" in which the images 146A of the sightseeing facilities belonging to the corresponding facility type are three-dimensionally displayed while arranged in a ring shape, and the number of the sightseeing facilities belonging to each facility type and the contents of the sightseeing facilities can be roughly grasped by the images 146A constituting the selection buttons 178A to 178C.

Returning to FIG. 15, the controller 110 displays the seasonal information display screen 175 in step SD2, and then determines whether any sightseeing facility of the sightseeing facility display area 176 is touched and thus set as a via place or destination (step SE3). When it is set (step SE3: YES), the controller 110 starts the route guidance to the sightseeing facility while the screen display of the display panel 2 is set as the route guidance screen (step SE4), and then finishes the processing.

On the other hand, when the sightseeing facility is not set to neither via place nor destination in step SE3 (step SE3: NO), the controller 110 repetitively executes the processing of the step SD3 until the vehicle exits the sightseeing area (step SE5: NO).

When the vehicle exists the sightseeing area (step SE5: YES), the screen display of the display panel 2 is quickly returned to the periphery display or the display screen for route guidance (step SE6), and then finishes the processing.

When a fixed time elapses form the display of the seasonal information display screen 175, the display screen may be automatically returned to the screen of the step SD2 (see FIG. 14) before the seasonal information button 170 is touched.

As described above, according to this embodiment, when the vehicle enters a sightseeing area, the seasonal information button 170 for instructing the display of seasonal information of sightseeing facilities is automatically displayed on the map screen. Therefore, the display of the seasonal information button 170 enables a user to recognize that the vehicle moves within the sightseeing area. Furthermore, it can also notify the user of existence of sightseeing facilities circumferentially.

Particularly, a user who drives without settling any destination can be notified of existence of sightseeing facilities as candidates for drop by around the vehicle.

In addition, the seasonal information of sightseeing facilities is displayed only when the seasonal information button 170 is touched, and thus reduction of the visibility of the map screen can be avoided, and the seasonal information of the sightseeing facilities can be presented only when the user desires the seasonal information.

Furthermore, according to this embodiment, in connection with the touch of the seasonal information button 170, the detail information and the seasonal information are displayed on the seasonal information display screen 175 every sightseeing facility. Therefore, the user can surely and easily find out interesting ones from the sightseeing facilities existing around the user in consideration of these information.

Furthermore, when any sightseeing facility is touched on the seasonal information display screen 175, the touched sightseeing facility is set as a destination or via place, and the route guidance to the destination or the via place is started. Therefore, when the user finds out a sightseeing facility which he/she wants to visit, the user is quickly guided to the sightseeing facility by merely touching the sightseeing facility.

According to this embodiment, the sightseeing facilities are classified every facility type and displayed on the seasonal information display screen 175, and the facility type to be displayed can be selected. Therefore, only the sightseeing facilities of the facility type which the user desires can be surely presented.

Furthermore, the selection buttons 178A to 178C for selecting the facility type are displayed in the so-called "fun ring" style, and the number of sightseeing facilities belonging to each facility type can be visually recognized. Therefore, it can be surely presented to the user which types of sightseeing facilities exist numerously.

It is needless to say that a numerical value representing the number of sightseeing facilities belonging to each facility type may be additionally displayed on each of the selection buttons 178A to 178C.

According to this embodiment, when the vehicle enters a prescribed sightseeing area, only sightseeing facilities are displayed on the map 4. Therefore, the user can easily recognize what kinds of sightseeing facilities exist circumferentially.

Furthermore, the display of the sightseeing facilities as described above is executed only when the vehicle is located within a sightseeing area, and when the vehicle is located out of the sightseeing area, the display is automatically returned to the original map display on which landmarks 6 are displayed. Therefore, the information of the sightseeing facilities can be surely presented only when the vehicle moves within the sightseeing area.

Still furthermore, according to this embodiment, the sightseeing facilities displayed on the map 4 are limited to at least sightseeing facilities which are available at present and also recommended (optimum) to visit in the present season or period. Therefore, only the sightseeing facilities which are matched with the period or season can be surely presented to the user.

Still furthermore, according to this embodiment, the seasonal information is obtained from the external server 116, and thus information which varies as seasonal information minutely can be presented to the user.

Furthermore, the seasonal information is obtained from the external server 116 not at the timing that the vehicle enters the sightseeing area, but at the timing that the display of the seasonal information is instructed by the user. Therefore, unnecessary communication with the external server 16 is suppressed.

The above-described embodiment is an embodiment of the present invention, and thus any modifications and applications may be made within the scope of the present invention.

The invention claimed is:

1. A navigation device for displaying a map screen on which a mark representing a present position of a mobile object is displayed together with landmarks around the mobile object, the navigation device comprising:
   a storage unit configured to store positions of prescribed sightseeing areas and sightseeing facilities within each of the prescribed sightseeing areas;
   a detecting unit configured to detect whether the mobile object enters one of the prescribed sightseeing areas; and
   a controller with an automatic facility display mode, configured to:
   read out information on the sightseeing facilities within one of the prescribed sightseeing areas from the storage unit,
   automatically display the read-out information on the sightseeing facilities on a map displayed on the map screen, and
   reduce display of the landmarks around the mobile object when the automatic facility display mode is selected and when the detecting unit detects that the mobile object has entered the one of the prescribed sightseeing areas.

2. The navigation device according to claim 1, wherein in the automatic facility display mode, the controller is further configured such that when the mobile object exits the one of the prescribed sightseeing areas, the display of the sightseeing facilities within one of the prescribed sightseeing areas is automatically canceled.

3. The navigation device according to claim 1, further comprising a setting unit configured to set a sightseeing facility displayed in the automatic facility display mode to a destination or a via place, wherein when the sightseeing facility is set as a destination or via place by the setting unit, display-canceled landmarks are displayed, and route guidance to the sightseeing facility is started.

4. The navigation device according to claim 1, further comprising a selecting unit configured to select a sightseeing facility displayed in the automatic facility display mode, wherein when the sightseeing facility is selected by the selecting unit, the periphery of the selected sightseeing facility is enlarged to produce an enlarged map, information on the selected sightseeing facility is displayed, and information representing the distance from the selected sightseeing facility to the present position of the mobile object is displayed on the enlarged map.

5. The navigation device according to claim 1, further comprising a display device configured to display the map screen that can be operated by touch of a user, wherein:
   the storage unit stores the positions of the prescribed sightseeing areas and timely information of the sightseeing facilities for a present season or period of time, and
   the controller is configured to display an instruction button for instructing to display the timely information of the sightseeing facilities on the map screen when the detecting unit detects that the mobile object has entered the one of the prescribed sightseeing areas.

6. The navigation device according to claim 5, wherein:
   the storage unit further stores at least facility information representing the contents of the sightseeing facilities, and
   the controller displays the facility information and timely information of the sightseeing facilities so that a touch operation can be performed on a sightseeing facility when the instruction button is touched, sets the touched sightseeing facility as a destination or a via place and starts when some of the sightseeing facilities are touched, and starts rouge guidance to the destination or the via place.

7. The navigation device according to claim 6, wherein:
   the storage unit stores information regarding the sightseeing facilities while classifying the sightseeing facilities into plural facility types, and
   when the instruction button is touched, the controller displays the timely information and the facility information of the sightseeing facilities belonging to one facility type in a list style, and also displays, for every facility type, a selection button for selecting a facility type to be displayed in the list style so that the number of sightseeing facilities belonging to the facility type can be visually recognized by the selection buttons displayed.

8. The navigation device according to claim 5, wherein:
when the mobile object is located outside of a prescribed sightseeing area, the controller displays facilities existing around the mobile object on the map screen of the display device, and
when the mobile object is located within the prescribed sightseeing area, the controller displays the sightseeing facilities in place of the facilities around the mobile object outside the prescribed sightseeing area on the map screen of the display device.

9. The navigation device according to claim 8, wherein when the mobile object is located within the prescribed sightseeing area, the controller extracts information regarding at least presently available sightseeing facilities from the sightseeing facilities within the prescribed sightseeing area based on the present date and hour, and displays the extracted information regarding at least presently available sightseeing facilities on the map screen.

10. The navigation device according to claim 5, further comprising a communication unit configured to communicate with an external server for accumulating timely information of the sightseeing facilities through a network, wherein when the instruction button is touched, the controller receives from the external server timely information of sightseeing facilities within a sightseeing area in which the mobile object is located, and displays the received timely information from the external server on the display device of the navigation device.

* * * * *